(12) United States Patent
Park et al.

(10) Patent No.: US 8,406,310 B2
(45) Date of Patent: Mar. 26, 2013

(54) WATER RING ENCODING METHOD

(75) Inventors: Gwang-Hoon Park, Gangwon-do (KR); Chie-Teuk Ahn, Taejeon (KR); Won-Sik Cheong, Taejeon (KR); Jin-Woong Kim, Taejeon (KR); Kyu-Heon Kim, Seoul (KR); Myoung-Ho Lee, Taejeon (KR); Yoon-Jin Lee, Jeonrabook-do (KR); Young-Kwon Lim, Taejeon (KR)

(73) Assignees: Electronics and Telecommunications Research Institute, Daejeon (KR); Gwang-Hoon Park, Gangwon-do (KR)

( * ) Notice: Subject to any disclaimer, the term of this patent is extended or adjusted under 35 U.S.C. 154(b) by 1750 days.

(21) Appl. No.: 11/623,157

(22) Filed: Jan. 15, 2007

(65) Prior Publication Data

US 2007/0116127 A1 May 24, 2007

Related U.S. Application Data

(63) Continuation of application No. 10/332,205, filed as application No. PCT/KR01/01168 on Jul. 7, 2001, now Pat. No. 7,388,916.

(30) Foreign Application Priority Data

Jul. 7, 2000 (KR) .................... 2000-38962
Dec. 27, 2000 (KR) .................... 2000-83366

(51) Int. Cl.
*H04N 7/18* (2006.01)
(52) U.S. Cl. .................................................. 375/240.26
(58) Field of Classification Search . 375/240.01–240.29
See application file for complete search history.

(56) References Cited

U.S. PATENT DOCUMENTS 6,728,317 B1 * 4/2004 Demos ................ 375/240.21
6,973,128 B2 * 12/2005 Zhou et al. ........... 375/240.11

FOREIGN PATENT DOCUMENTS

| JP | 52-143712 A | 11/1977 |
| JP | 02-056187 A | 2/1990 |
| JP | 05-048914 A | 2/1993 |
| JP | 05-083567 A | 4/1993 |
| JP | 05-252499 A | 9/1993 |
| JP | 09-182073 A | 7/1997 |
| JP | 10-215454 A | 8/1998 |
| JP | 11-046372 A | 2/1999 |

OTHER PUBLICATIONS

USPTO Office Action mailed Oct. 4, 2010 in connection with U.S. Appl. No, 11/623,139.

(Continued)

*Primary Examiner* — Andy Rao
(74) *Attorney, Agent, or Firm* — Ladas & Parry LLP

(57) ABSTRACT

A water ring encoding method of processing an initial data set, such as an image frame, is disclosed having a writing step and an encoding step. The initial data set is organized with at least one initial origin enveloped by a plurality of nested initial environs successively surrounding each other in the initial data set. The writing step includes writing a portion of data from the initial data set into a scanned data string, by starting the writing of the portion of the data from the initial data set into the scanned data string at the RC grouping corresponding to the initial origin (initial water ring (0)) and by sequentially progressing the writing outwardly from the family of RC groupings corresponding to the nearest nested initial environ (initial water ring (1)) towards the family of RC groupings corresponding to a furthest nested initial environ (initial water ring (n)). The encoding step includes encoding the scanned data string into an encoded data string.

30 Claims, 17 Drawing Sheets

OTHER PUBLICATIONS

USPTO Office Action mailed Oct. 4, 2010 in connection with U.S. Appl. No. 11/741,919.

USPTO Notice of Allowance mailed Oct. 4, 2010 in connection with U.S. Appl. No. 11/623,131.

\* cited by examiner

☒ DECODED MACRO BLOCK (OR BLOCK)
☐ NOT DECODED MACRO BLOCK (OR BLOCK)

WATER RING SCAN ORDER

| 5 | 4 | 4 | 4 | 4 | 4 | 4 | 4 | 4 | 4 | 5 |
|---|---|---|---|---|---|---|---|---|---|---|
| 5 | 4 | 3 | 3 | 3 | 3 | 3 | 3 | 3 | 4 | 5 |
| 5 | 4 | 3 | 2 | 2 | 2 | 2 | 2 | 3 | 4 | 5 |
| 5 | 4 | 3 | 2 | 1 | 1 | 1 | 2 | 3 | 4 | 5 |
| 5 | 4 | 3 | 2 | 1 | 0 | 1 | 2 | 3 | 4 | 5 |
| 5 | 4 | 3 | 2 | 1 | 1 | 1 | 2 | 3 | 4 | 5 |
| 5 | 4 | 3 | 2 | 2 | 2 | 2 | 2 | 3 | 4 | 5 |
| 5 | 4 | 3 | 3 | 3 | 3 | 3 | 3 | 3 | 4 | 5 |
| 5 | 4 | 4 | 4 | 4 | 4 | 4 | 4 | 4 | 4 | 5 |

WATER RING ENCODING METHOD

CROSS-REFERENCE TO RELATED APPLICATIONS

This patent application is a continuation application of U.S. Ser. No. 10/332,205 filed on Jul. 7, 2001 which is a 371 completion of PCT KR2001/001168 filed on Jul. 7, 2000 which claims priority to which claims priority to Korean Application No. 2000/38962 filed on Jul. 7, 2000 and Korean Application No. 2000/83366, filed on Dec. 27, 2000.

TECHNICAL FIELD

The present invention relates to a water ring scanning apparatus and method, and an apparatus and method for encoding/decoding video sequences using the same; and more particularly to a water ring scanning apparatus and method that encodes a video sequence at an certain, arbitrary spot most preferentially, encodes the adjacent sequence on the outskirt of the video sequence and then continues to repeat the same procedure, and a computer-readable recording medium for recording a program that embodies the method as well as an apparatus and method for encoding/decoding video sequence that transmit image information in a way suitable to the human visual system (HVS) by using a water ring scan order, thus providing image with superb quality.

BACKGROUND ART

There is an explosive demand for a scalable encoding method as an image encoding method, both a still image and a moving picture alike. Particularly, people want to obtain, manage and modify image information by using mobile telecommunication services that makes anyone possible to communicate with whomever, wherever and whenever with use of image information, and information household appliances that are connected with various kinds of computers such as laptops, palm top computers, PDAs and so forth, which have been brought with the introduction of a wireless internet.

Therefore, diverse forms of image information household appliances such as an IMT-2000 video phone and HDTV will be shown in the market and the decoding ability or information transmission environment of those image information household appliances will be different from each other, for the properties and application environment are different according to the kind of a terminal.

What needs to be considered here is how to transmit moving picture that is suitable to each terminal. For instance, if encoding is done in agreement with a low quality decoder, a user with a high quality decoder will receive the low quality image with his expensive decoder, which no one ever wants. That is, a user with a high quality decoder should well have to obtain high quality image and even a user with a low quality decoder will have to be transmitted with quite a level of an image.

To address this problem, MPEG-4 (Moving Pictures Expert Group-4) designs to provide various levels of image quality according to the environment and performance of a terminal on the receiving part. For example, when the terminal of the receiving part is of high computing power and delivery layers, e.g., wireless, ATM, LAN, etc., are in good condition, it can receive and display a high quality moving picture. However, when its computing power and delivery lines are not in good condition, it cannot receive the high quality image. To accommodate both cases, MPEG-4 is designed to perform scalable coding.

The scalable coding is a method of the encoding part making and transmitting scalable bitstreams so that the receiving part could receive various qualities of an image from the low quality to the high quality. That is, if bitstreams are scalable, a low-performance receiving terminal will receive and display image bitstreams of basic quality, which have been encoded in the base layer while a high-performance receiving terminal receives and displays high quality image bitstreams, which have been encoded in the enhancement layer.

The scalable coding method largely consists of a base layer and an enhancement layer. The base layer of the encoding part transmits basic moving picture information and its enhancement layer transmits information for providing image of advanced quality in addition to the basic quality of moving picture information so that the receiving part could put the information and the information from the base layer together and decode into high quality image.

Therefore, the receiving part gets to decode image information of the two layers transmitted in accordance with the computing power of the receiving terminal and the condition of the delivery layers. So, if a decoder does not have sufficient decoding ability for all information transmitted through the delivery layers, it will be able to decode only information of the base layers, which is the minimum image quality compensation layer, and the information of the enhancement layer will not be decoded and dismissed. In the mean time, a high quality receiving apparatus can bring in information from all layers and achieves high quality image. This way, using the scalable coding method, images satisfying both users with a high quality decoder and with a low quality decoder can be transmitted.

The present scalable coding methods are classified into two types: one is a spatial scalable coding method, the other is a temporal scalable coding method. The spatial scalable coding method is used for improving the spatial resolution step by step while the temporal scalable coding method is used to improve the number of images (in case of TV broadcasting, 30 frames/sec) shown in a unit time on the axis of time (for example, 10 Hz→30 Hz). To do the scalable coding, MPEG-4 forms one or more enhancement layers and transmits bitstreams to the receiving part. In case of a moving picture coding using one enhancement layer, the base layer encodes and transmits image of low resolution both spatially and temporally basically, while the enhancement layer additionally encodes and transmits image information for embodying improved resolution in addition to the image information transmitted from the base layer.

Conventional scalable coding method described above is designed suitable when the delivery layers are in a relatively stable and good condition. That is, an image frame can be restored only when the receiving part receives all bitstreams transmitted from the enhancement layers. If the condition of the delivery layers changes (the bitstream bandwidth that delivery layers can accommodate changes: delivery layers like the Internet changes its bandwidth to be allocated to users by external factors such as the number of Internet users) and all the bitstreams from the enhancement layer are not received, the corresponding image cannot be restored normally. In this case, the receiving part should request the transmitting part for retransmission, or give up performing image restoration until all the bitstreams are received, or perform transmission error concealment by using the previous frame image.

It frequently happens in the wired/wireless Internet that image bitstreams are not transmitted as fast as to catch up with the realtime due to the unstable condition of the delivery layers condition. In short, to restore the transmitted image in real-time even when the bandwidth changes due to the unstable delivery layer condition as happens in the wired/wireless Internet, the receiving part must be able to restore image in real-time with the part of image bitstreams which have been received till then, although it hasn't received all the bitstreams. One example for this is a fine granular scalability (FGS) method suggested by the MPEG-4 and established as a draft international standard.

The fine granular scalable coding method makes it possible to restore a transmitted image with bitstreams that have been received till then, when the receiving part does not receive all the bitstreams encoded in and transmitted from the base layer encoder and the enhancement layer encoder, for instance, when the delivery layer is in unstable, and the delivery layer changes suddenly such as in the wired/wireless Internet and the bandwidth to be allocated to users changes while the scalable coding is performed. It is designed to supplement the shortcoming of the conventional scalable coding method embodied in consideration of a stable delivery layer, in which image can finally be restored after all bitstreams are received, thus causing delay in receiving image, and retransmission has to be requested or transmission error concealment should be performed when transmission error generates.

In order to receive part of image bitstreams and make the transmitted image restored efficiently at the receiving part, the fine granular coding method transmits image bitstreams on a bit-plane basis, when the transmitting part embodies an image with improved quality at the base layer based on the transmitted image and transmits it. That is, it is similar to the conventional scalable coding method in that it improves the quality of a transmitted image by sending out image difference between the original image and the image transmitted from the base layer, when transmitting bitstreams needed for the enhancement layer from the transmitting part to the receiving part. But even when the bandwidth of the delivery layers changes suddenly and not all the bits needed for image restoration have been received this present method can restore an image, to what extend, with bitstreams as much as received till then, by dividing image information to be transmitted according to each bit-plane, transmitting the most significant bit (MSB) with priority, and then dividing the next significant bit according to each bit-plane and transmitting them on and on.

For instance, when we suppose that there is image information of 25 to be transmitted and when we express it into binary numbers, it becomes "11001," which consists of five bit-planes. To transmit this information per bit-plane, first of all, the transmitting part should notify the receiving part that the transmission information is composed of five bit-planes. Then when it is supposed to be transmitted to the receiving part from the most significant bit (MSB) to the least significant bit (LSB) on a bit basis, if the transmission of the first MSB is completed, the receiving part will acknowledge that the transmitted information is a figure more than 16(10000), and after the transmission of a second MSB, it will get to know that a figure more than 24(11000) will be transmitted thereto. If no more bitstream can be transmitted to the receiving part due to the width restriction of the delivery layer, the receiving part can restore the figure 24, a similar figure of what is originally supposed to be transmitted, by using the bitstream (11000) transmitted till then.

The fine granular scalable coding method used in MPEG-4 considers a situation where the bandwidth of the delivery layer may change at any time. The structure of the basic fine granular scalable coding method is shown in FIG. 1A.

FIG. 1A is a structural diagram of the conventional basic fine granular scalability (FGS) coding method. As illustrated in the figure, it has a base layer and a fine granular scalability layer as an enhancement layer. The base layer is adopting the conventional MPEG-4 encoding method without any intactness. It is unique in that it only seeks to increase coding efficiency in the base layer, not considering any method for increasing coding efficiency in the FGS layer, the enhancement layers, because delivery layer should be considered to do it.

Just as shown, spatial scalability should adopt the structure of FIG. 1A, while for temporal scalability, structures of FIGS. 1B and 1C are to be adopted.

FIG. 1B shows a structural diagram of the conventional fine granular scalability (FGS) coding method with two improvement steps of FGS and FGST (Fine Granular Scalability Temporal) and FIG. 1C represents a structural diagram of the conventional fine granular scalability (FGS) coding method with an enhancement step in which the FGS and FGST are integrated.

Here, the FGST (Fine Granular Scalability Temporal) carries out motion estimation and compensation to increase coding efficiency. But this also considers a method for increasing coding efficiency in the base layer only.

FIG. 2A shows the structure of an encoder, i.e., the transmitting part, of a fine granular scalable coding method used in the MPEG-4 Draft International Standard.

The figure, FIG. 2A, is a structural diagram depicting an encoder of the conventional fine granular scalability (FGS) coding method in accordance with an embodiment of the present invention.

As shown in the drawing, the base layer is using the MPEG-4 image encoding method as it is without any intactness. The image encoding method used in the base layer includes performing image data compression in the direction of the spatial axis and the temporal axis by performing discrete cosine transform (DCT), quantization (Q), motion estimation (ME), motion compensation (MC), inverse quantization (Q−1), and inverse discrete cosine transform (IDCT) implementing entropy coding according to the preponderance of sign generation probability by performing variable length coding, and transmitting base layer bitstream generated while encoding to delivery layer with use of a transmission buffer.

As shown in the drawing, the FGS encoding of the enhancement layer is performed through the procedures of obtaining residues between the original image and the image restored in the base layer, performing discrete cosine transform (DCT), performing bit-plane shift, finding maximum value, and performing bit-plane variable length encoding (Bit-plane VLC).

In the procedure of obtaining the residue, the residue is obtained by calculating the difference between the original image and the image restored in the base layer, the image that passes through $Q^{-1}$ and IDCT and clipped in the drawing.

In the process of discrete cosine transform, the image-base residues obtained in the above procedure is transformed into the DCT domain by using a block-unit DCT, which is 8×8.

Here, if you want a block with optionally higher quality, the corresponding value has to be transmitted prior to anything else, and for this, bit-plane shift may be performed optionally. This is defined as a selective enhancement, which is performed in the procedure of bit-plane shift.

In the procedure of finding the maximum value, the maximum value is obtained out of all the other values that have gone through the discrete cosine transform according to their absolute value. The maximum value is used to calculate the number of maximum bit-planes for transmitting a corresponding image frame.

In the procedure of the bit-plane variable length encoding, 64 DCT coefficients obtained on a block basis according to each bit-plane are inserted in a matrix in a zigzag scan order, the bit-plane of a corresponding bit of a DCT coefficient being 0 or 1, and each matrix is run-length encoded according to the variable length code table (VLC table).

FIG. 2B shows the structure of a decoder, i.e., the receiving part, of a fine granular scalable coding method used in the MPEG-4 Draft International Standard.

FIG. 2B is a structural diagram depicting a decoding part of the conventional fine granular scalability (FGS) coding method in accordance with an embodiment of the present invention.

As illustrated in the drawing, the decoding of transmission bitstreams that are divided into the base layer and the enhancement layer and transmitted from the delivery layers is performed in reverse to that of the encoder depicted in FIG. 2A.

In the base layer, the MPEG-4 image decoding method is used as it is without any intactness. The image transmitted from the base layer is restored by after the bitstream is inputted in the base layer, conducing variable length decoding (VLD), performing inverse quantization (Q−1), carrying out inverse discrete cosine transform (IDCT) on the corresponding values, adding them to motion compensation (MC) values, and clipping the corresponding values between the values from 0 to 255.

In the enhancement layer of the fine scalable coding method, the decoding of the bitstreams transmitted to the enhancement layer is performed in reverse to that of an encoder. First, bit-plane VLD is performed on the inputted enhancement bitstream, and if the location of a block with optionally higher image quality optionally, bit-plane shift may be performed.

On the values obtained by conducing bit-plain VLD and performing shift optionally, block-based (8×8) inverse discrete cosine transform (IDCT) is performed and the image transmitted from the enhancement layer is restored. Then the image is combined with the image decoded in the base layer, and clipping the sum values into the values between 0 and 255, restoring the image improved finally.

The problem of the conventional technique described above is as following.

The scalable coding method that has been used conventionally in encoding moving pictures is designed to be suitable for a condition where delivery layers are relatively stable. A corresponding image frame can be restored only when all the bitstream transmitted from the enhancement layer of the transmitting part is received in the receiving part. Here, if the condition of the delivery layers changes suddenly, for instance, the bandwidth that the delivery layer can accommodate changes, or in such a delivery layer as the Internet, the bandwidth to be allocated to users changes by external factors like the number of internet users, and all the bitstreams from the enhancement layer are not received, that image can not be restored and shown properly. Therefore, there is a shortcoming of having to request retransmission to the receiving part, aborting image restoration until all bitstreams are received, or performing transmission error concealment by using the image of previous image.

Meanwhile, supplementing the shortcoming by considering a delivery layer where the conventional scalable coding method is stable, images transmitted from the transmitting part to the receiving part should be restored in realtime even when the bandwidth changes due to the unstable delivery layers such as the wired/wireless Internet. One method for it is a fine granular scalability (FGS) method, which restores a transmitted image real-time by using image bitstreams received until then when the receiving part does not receive the whole bitstreams. Here, to make an image restored with only part of the whole bitstreams, only a method maximizing the coding efficiency from the base layer should be used. A method like increasing image coding efficiency between enhancement layers does not work.

It is figured out that moving picture coding methods using DCT, which are mostly used in JPEG (Joint Photographics Expert Group), H.263, MPEG and so forth, are coded and transmitted on a macro block and 8×8 block basis. Here, the encoding and decoding of all the image frames or the video object plane (VOP) begin from the macro block, or block, at the upper-left line of the image and proceed to the one at the bottom-left part successively. In this invention, this is referred to as normal scan order, which is illustrated in FIG. 3A.

The normal scan order is a scan order that has to be used necessarily to restore image normally at the receiving part. It uses such methods as motion estimation and compensation, DC value estimation, of increasing coding efficiency between the base layer and the enhancement layer, or between enhancement layers.

When applying the scan order to the scalable coding method that makes it possible to restore the image with only part of bitstreams it received, part of macro block or block at the upper part is decoded and the restored image is displayed on the screen of the receiving part as illustrated in FIG. 3B. The black blocks are decoded blocks, while white blocks are ones that have not been decoded yet.

That is, bitstreams transmitted from the base layer added with those partial bitstreams received from the enhancement layer and decoded display an improved image in the receiving part. As depicted in FIG. 3B, if only upper part of the image data are received and decoded from the enhancement layer, the restored image gets to have improved image only on the part where decoding is performed in the enhancement layer. However, there is a shortcoming that in case the improved part of the restored image is where viewers do not pay attention, such as background, or something else except the face of an actor, this process of receiving and restoring bitstreams of the enhancement layer becomes of no use.

In the mean time, as shown in FIG. 4, the conventional method for coding image and moving picture applied with subband coding that uses such a method as a wavelet coding is using the normal scan order, conducing encoding and decoding on a pixel basis according to each subband from the image data of the upper-left pixels toward bottom-left pixels. When applying this method to the scalable coding method that restores image with the reception of partial bitstreams, the pixel values above the subband received finally are decoded and the restored image of them is displayed in the screen of the receiving part. That is, bitstreams transmitted from the base layer is received, added to those decoded in the enhancement layer and generates improved image in the receiving part. Here, in case the data of the upper part of the image are received and decoded, the restored image will show improved image quality in the part whose image data are decoded in the enhancement layer, which is marked in FIG. 4. But there is a shortcoming that in case the improved part of the restored image is where viewers pay no or less attention, such as background or something else except the face of actors, this process of receiving bitstreams of the enhancement layer and restoring becomes of no use because they don't recognize it.

DISCLOSURE OF INVENTION

It is, therefore, an object of the present invention to provide an apparatus and method of water ring scan that encodes a certain part of image information on a top priority and then repeatedly performs the procedure of encoding the neighboring part of the image information, and a computer-based recording medium for recording a program that embodies the method.

It is another object of the present invention to provide an image encoding/decoding apparatus and method for transmitting image information in a suitable way for the human visual system (HVS) by using a water ring scan order and a computer-based recording medium for recording a program that embodies the method.

In accordance with one aspect of the present invention, there is provided a water ring scanning apparatus, comprising: a water ring scan starting means for scanning information at an origin point of a water ring (water ring (0)), which is a visually significant part of an image frame on which water ring scan is to be performed first; a water ring scan location determination means for determining a location of a next water ring which is a (water ring (1)) square-shaped water ring surrounding the origin point of the water ring, and a location of $i^{th}$ generated square-shaped water ring (water ring (i)) surrounding the water rings of processed previously; and a water ring scanning means for scanning information on the location of the water ring scan determined at the water ring scan location determination means.

In accordance with one aspect of the present invention, there is provided a water ring scanning apparatus for encoding an image, comprising: a water ring origin point data encoding means for encoding data at an origin point of a water ring, which is a visually significant part of an image frame to be encoded and transmitted first; a water ring location determination and data encoding means for determining a location of an $i^{th}$ generated water ring (water ring (i)) from the origin point of the water ring and encoding the data corresponding thereto; and a repetition determination means for determining a location of a water ring and encoding the data corresponding thereto repeatedly until all data in the image frame are encoded.

In accordance with one aspect of the present invention, there is provided a water ring scanning apparatus for decoding an image, comprising: a water ring origin point data decoding means for decoding the data at an origin point of a water ring, which being a visually significant part of an image, should be decoded with priority in an image frame; a water ring location determination and data decoding means for determining the location of a water ring (i) that generates in the $i^{th}$ from the origin point of the water ring and decoding the data corresponding thereto; and a repetition determination means for determining the location of a water ring and decoding the data corresponding thereto.

In accordance with one aspect of the present invention, there is provided a water ring scanning method applied to a water ring scanning apparatus, comprising the steps of: a) starting water ring scan from an origin point of a water ring (water ring (0)), which is a visually significant part of an image to be performed the water ring scan first; b) determining a location for a next water ring (water ring (1)) which is a rectangular shape water ring surrounding the origin point of the water ring and performing the water ring scan of the next water ring; and c) determining a location of a next water ring (water ring (i)) which is a rectangular shape water ring surrounding the water rings scanned previously and scanning data at the water ring (i), until all the data are scanned.

In accordance with one aspect of the present invention, there is provided a water ring scanning method applied to a water ring scanning apparatus for encoding an image, comprising the steps of: a) encoding data from an origin point of a water ring in an image frame, which is a visually significant part of an image to be encoded and transmitted first; b) determining if all data are encoded; and c) if all the data are encoded, terminating the procedures, and if not, determining a location of a next water ring and encoding data at the location of the next water ring until all the data are encoded.

In accordance with one aspect of the present invention, there is provided a water ring scanning method applied to a water ring scanning apparatus for decoding an image, comprising the steps of: a) decoding data from an origin point of a water ring in an image frame, which is a visually significant part of an image to be decoded; b) determining if all data are decoded; and c) if all the data are decoded, terminating the procedures, and if not, determining a location of a next water ring and decoding data at the location of the next water ring until all the data are decoded.

In accordance with one aspect of the present invention, there is provided an image encoding/decoding apparatus using a water ring scanning apparatus, comprising: a first water ring generation means for generating water rings for all first data, starting from an origin point of the water rings, which is a visually significant part of an image frame to be encoded first by using the water ring scanning apparatus; an encoding means for encoding and transmitting to the decoding apparatus the first data corresponding to the first water rings generated by the first water ring generation means; a second water ring generation means for generating water rings for all second data, starting from an origin point of the water rings, which is a visually significant part of an image frame to be decoded first by using the water ring scanning apparatus, according to the location of water rings generated by the first water ring generation means; and a decoding means for decoding the second data corresponding to the second water rings generated by the second water ring generation means.

In accordance with one aspect of the present invention, there is provided a method for encoding/decoding an image frame applied to an image encoding/decoding apparatus using a water ring scanning apparatus, comprising the steps of: a) generating water rings successively for all first data, starting from an origin point of the water rings, which is a visually a significant part of an image frame to be encoded first by using the water ring scanning apparatus; b) encoding and transmitting to the decoding apparatus the first data corresponding to the first water rings that have generated in the step a) successively; c) generating water rings for all second data, starting from an origin point of the water rings, which is a visually significant part of the image frame to be decoded first by using the water ring scanning apparatus, according to the location of water rings generated in the step a); and d) decoding the second data corresponding to the second water rings generated in the step c) successively.

In accordance with one aspect of the present invention, there is provided a scalable image encoding/decoding apparatus using a water ring scanning apparatus, comprising: a base layer encoding means for encoding an input image frame on a base layer, generating base layer bitstreams and transmitting the base layer bitstreams to the decoding apparatus; an enhancement layer encoding means for encoding the input image frame on an enhancement layer starting from an origin point of a water ring, which is a visually significant part of the image frame to be encoded first by using the water ring scanning apparatus, generating enhancement bitstreams and transmitting the enhancement bitstreams to the decoding apparatus;

a base layer decoding means for receiving the base layer bitstreams from the base layer encoding means and restoring the image frame by performing the base layer decoding; and an enhancement layer decoding means for receiving the enhancement layer bitstreams from the enhancement layer encoding means and restoring the image frame by decoding the enhancement bitstreams from the origin point of the water ring, which is a visually significant part of the image frame to be decoded first.

In accordance with one aspect of the present invention, there is provided a scalable image encoding/decoding method applied to a scalable image encoding/decoding apparatus using a water ring scanning apparatus, comprising the steps of: a) encoding an input image frame on a base layer, generating base layer bitstreams and transmitting the base layer bitstreams to the decoding apparatus; b) encoding the input image frame on an enhancement layer starting from the origin point of the water ring, which is a visually significant part of the image frame to be encoded first by using the water ring scanning apparatus, generating enhancement bitsteams and transmitting the enhancement bitstreams to the decoding apparatus; c) receiving the base layer bitstreams which are encoded in the base layer and restoring the image frame by performing the base layer decoding; and d) receiving the enhancement layer bitstreams which are encoded in the enhancement layer and restoring the image frame by decoding the enhancement bitstreams from the origin point of the water ring, which is a visually significant part of the image to be decoded first.

In accordance with one aspect of the present invention, there is provided a fine granular scalable image encoding/decoding apparatus using a water ring scanning apparatus, comprising: a base layer encoding means for encoding an input image frame on a base layer, generating base layer bitstreams and transmitting the base layer bitstreams to the decoding apparatus; an enhancement layer encoding means for encoding an input image frame on an enhancement layer starting from an origin point of a water ring, which is a visually significant part of the image frame to be encoded first by using the water ring scanning apparatus, generating enhancement bitstreams and transmitting the enhancement bitstreams to the decoding apparatus; a base layer decoding means for receiving the base layer bitstreams from the base layer encoding means and restoring the image frame by performing the base layer decoding; and an enhancement layer decoding means for receiving the enhancement layer bitstreams from the enhancement layer encoding means and restoring the image frame by decoding the enhancement bitstreams from the origin point of the water ring, which is a visually significant part of the image frame to be decoded first.

In accordance with one aspect of the present invention, there is provided a fine granular scalable image encoding/decoding method applied to a fine granular scalable image encoding/decoding device using a water ring scanning apparatus, comprising the steps of: a) encoding an input image frame on a base layer, generating base layer bitstreams and transmitting the base layer bitstreams to the decoding apparatus; b) encoding an input image frame on an enhancement layer starting from an origin point of a water ring, which is a visually significant part of the image frame to be encoded first by using the water ring scanning apparatus, generating enhancement bitstreams and transmitting the enhancement bitstreams to the decoding apparatus; c) receiving the base layer bitstreams which are encoded in the base layer and restoring the image frame by performing the base layer decoding; and d) receiving the enhancement layer bitstreams which are encoded in the enhancement layer and restoring the image frame by decoding the enhancement from the origin point of the water ring, which is a visually significant part of the image frame to be decoded first.

In accordance with one aspect of the present invention, there is provided a computer-readable recording medium for recording instructions for executing a water ring scanning method in a water ring scanning apparatus with a processor, the method comprising the steps of: a) starting water ring scan from an origin point of a water ring (water ring (0)), which is a visually significant part of an image to be performed the water ring scan first; b) determining a location for a next water ring (water ring (1)) which is a rectangular shape water ring surrounding the origin point of the water ring and performing the water ring scan of the next water ring; and c) determining a location of a next water ring (water ring (i)) which is a square-shaped water ring surrounding the water rings scanned previously and scanning data at the water ring (i), until all the data are scanned.

In accordance with one aspect of the present invention, there is provided a computer-readable recording medium for recording instructions for executing an encoding method in a water ring scanning apparatus with a processor, the method comprising the steps of: a) starting encoding from the data at an origin point of a water ring, which is a visually significant part of an image to be encoded and transmitted first; b) determining if all data are encoded; and c) if all data have been encoded, terminating the procedures, and if not, determining a location for a next water ring and encoding data at the location of the next water ring until all the data are encoded.

In accordance with one aspect of the present invention, there is provided a computer-readable recording medium for recording instructions for executing a decoding method in a water ring scanning apparatus with a processor, the method comprising the steps of: a) starting decoding data from an origin point of a water ring in an image frame, which is a visually significant part of an image to be decoded first; b) determining if all data are decoded; and c) if all data have been decoded, terminating the procedures, and if not, determining a location of a next water ring and decoding data at the location of the next water ring, until all the data are decoded.

In accordance with one aspect of the present invention, there is provided a computer-readable recording medium for recording instructions for executing in an image encoding/decoding apparatus with a processor, the method comprising the steps of: a) generating water rings successively for all data starting from an origin point of a water ring, which being a visually a significant part of an image, should be decoded with priority in the image frame by using the water ring scanning apparatus; b) encoding and transmitting to the decoding apparatus the data corresponding to the water rings that have generated in the step a) successively; c) generating water rings for all data starting from an origin point of a water ring, which being a visually significant part of the image, should be decoded with priority in the image frame, according to the location of water rings that have generated in the step a); and d) decoding the data corresponding to the water rings generated in the step c) successively.

In accordance with one aspect of the present invention, there is provided a computer-readable recording medium for recording a program in a scalable image encoding/decoding apparatus with a processor, the method comprising the steps of: a) encoding an input image frame on a base layer, generating base layer bitstreams and transmitting the base layer bitstreams to the decoding apparatus; b) encoding an input image frame on an enhancement layer starting from an origin point of a water ring, which is a visually significant part of the image frame to be encoded first by using the water ring scanning apparatus, generating enhancement bitstreams and transmitting the enhancement bitstreams to the decoding apparatus; c) receiving the base layer bitstreams which are encoded in the base layer and restoring the image frame by performing the base layer decoding; and d) receiving the enhancement layer bitstreams which are encoded in the enhancement layer and restoring the image frame by decoding the enhancement bitstreams from the origin point of the water ring, which is a visually significant part of the image frame to be decoded first.

In accordance with one aspect of the present invention, there is provided a computer-readable recording medium for recording instructions for executing in a fine granular scalable image encoding/decoding apparatus with a processor, the method comprising the steps of: a) encoding an input image frame on a base layer, generating base layer bitstreams and transmitting the base layer bitstreams to the decoding apparatus; b) encoding an input image frame on an enhancement layer starting from the origin point of the water ring, which is a visually significant part of the image frame to be encoded first by using the water ring scanning apparatus, generating enhancement bitstreams and transmitting the enhancement bitstreams to the decoding apparatus; c) receiving the base layer bitstreams which are encoded in the base layer and restoring the image frame by performing the base layer decoding; and d) receiving the enhancement layer bitstreams which are encoded in the enhancement layer and restoring the image frame by decoding the enhancement bitstreams from the origin point of the water ring, which is a visually significant part of the image frame to be decoded first.

As described above, in making image restored with part of the bitstreams received, the coding efficiency of the base layer should be maximized and the method increasing the coding efficiency between the enhanced layers doesn't work. Therefore, when transmitting image information of the enhancement layer, it is possible to restore bitstreams transmitted from the decoder by using an arbitrary scan order without using the normal scan order. It can be processed regardless of causality.

Therefore, after encoding and transmitting a certain part of an image frame, i.e., the central part of it or the part where image quality needs to be improved in a frame, the present invention encodes the image information received till then prior to the others although not all the bitstreams are received, and improves the image quality of that part.

That is, the present invention begins encoding from a certain part of an image frame to be transmitted prior to anything else, transmits it to the receiving part so that the receiving part can decode the part prior to the others. So, when the bitstreams cannot be received any more due to the problem of the delivery layers, it just goes on to restore the transmitted image by using the bitstreams transmitted till then. In short, this invention transmits and receives a part of an image, which should be offered with improved quality on a top priority.

The water ring scan order of the present invention, encodes image information of a certain, arbitrary part with priority and then performs encoding image information of the neighboring part and then repeats it on and on. This is like water rings generates outward when a stone is thrown into a lake. Starting coding from a spot where a water ring is generated and then generating successively outward to its environs, the water ring is like just how data at a certain location is processed. That is, the present invention suggests a scan order in a water ring of a rectangular shape that successively surrounds the rings of image information processed previously.

The present invention encodes with priority a part of an image having visual importance so that it can be suitable to the eye system of a human being. Also, at the receiving part, the image information of a certain part is decoded with priority so that a significant part of the image can be shown in the improved quality, when all bitstreams cannot be received due to the limitation of the bandwidth of delivery layers.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Other objects and aspects of the invention will become apparent from the following description of the embodiments with reference to the accompanying drawings, which is set forth hereinafter.

Figure 5:
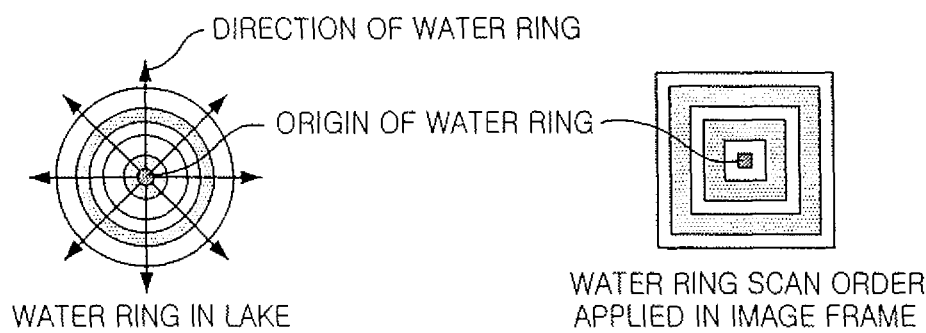
FIG. 5 is a conceptual view for describing the basic principle of a water ring scan order in accordance with the present invention.
Figure 5:
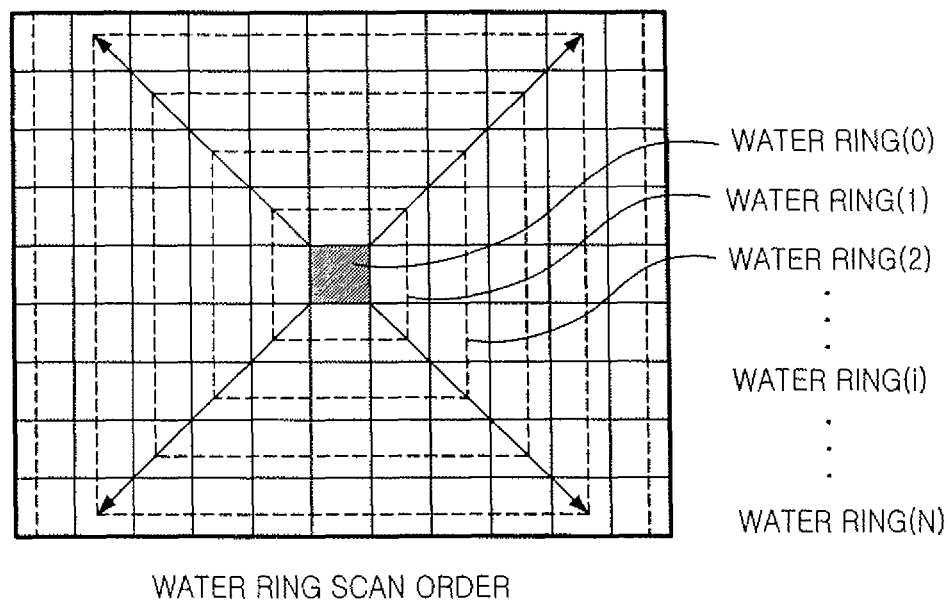

FIG. 5 is a conceptual view for describing the basic principle of a water ring scan order in accordance with the present invention.

The water ring scanning order of the present invention performs coding repeatedly from a corresponding location towards its environs, if a part to be coded is decided arbitrarily in an image frame, the coding area gets expanded to its environs.

The principle of the invention is just like water rings generating from a spot where a stone has fallen on the water surface when it is thrown into a lake, and its basic concept is illustrated in FIG. 5. Each block in the drawing stands for a pixel, a block or a macro block according to the image or moving picture processing method. When applying it to the coding moving picture, the coding begins from a spot where water ring is generated, i.e., where a stone is fallen on the water surface, and data are processed as water rings are generated consecutively towards the outskirts. That is, the present invention suggests a scan order in which starting from an origin point of a water ring, a rectangular shape of a water ring surrounding the water rings formed previously.

As illustrated in FIG. 5, after the data at the origin point of the water ring (water ring (0)) are processed, the data in the adjacent water ring (1), which is the eight data located on the outskirt of the previous water ring (0) are processed and then the data of the following water ring (2) and water ring (3) are processed continuously, this data processing appearing like water rings expanding. The scan order of the present invention that processes data in the form of generating and expanding water rings is called water ring scan order.

In coding an image or moving picture, this water ring scan order can be applied on a pixel, block or macro block basis.

For a coding method based on an image pixel that uses a wavelet conversion method, the water ring scan order is applied on a pixel basis, and for a method using the DCT, moving picture data are processed using a water ring scan order on a block or macro block basis.

Figure 6A:
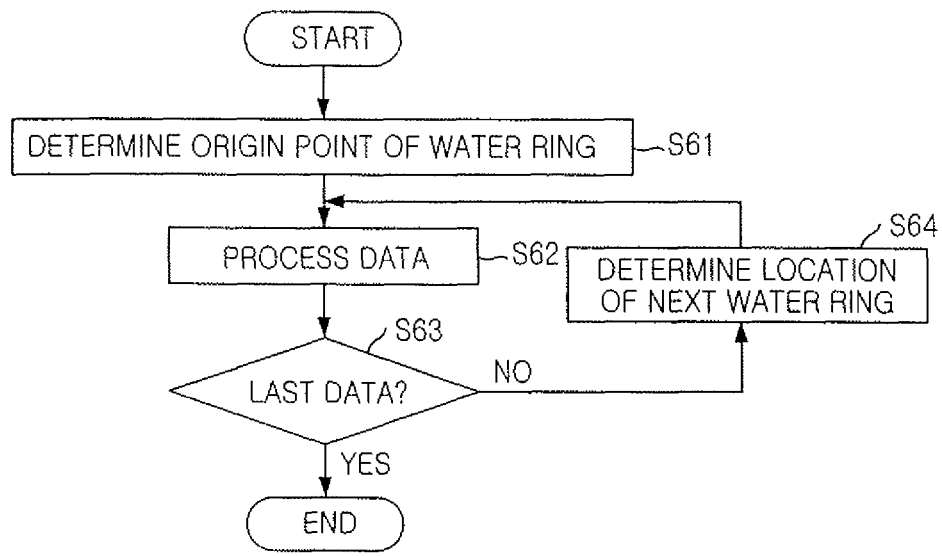
FIG. 6A is a flow chart of a water ring scanning method in accordance with an embodiment of the present invention.
Figure 6B:
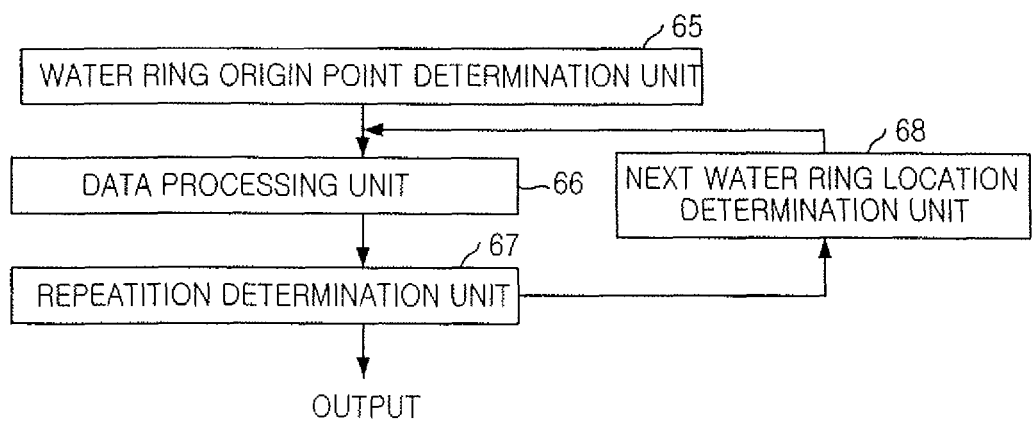
FIG. 6B is a diagram of a water ring scanning apparatus in accordance with an embodiment of the present invention.

FIG. 6A is a flow chart of a water ring scanning method in accordance with an embodiment of the present invention, and FIG. 6B is a diagram of a water ring scanning apparatus in accordance with an embodiment of the present invention.

As illustrated in the drawings, an arbitrary point where water ring water will be generated is determined at a water ring origin point determination unit 65 at S61. Then the data processing unit 66 processes the data at a corresponding location (water ring (0)). And then, determining whether all data are processed at a repetition determination unit 67 at S63, if all the data are processed, the logic flow is terminated and if not, the location of the adjacent water ring (1) is determined at S64 at the next water ring location determination unit 68 and the data processing procedures of S62 at a corresponding location is performed repeatedly.

The water ring scanning apparatus includes a water ring generation point determination unit 65 and the data processing unit 66 for determining an arbitrary location of a water ring to be generated in an image frame and processing the data at the corresponding location; a water ring location determination and processing units 68 and 66 for determining the location of a water ring generated $i^{th}$ from the origin point of the water ring and processing the data at the corresponding location; and a repetition determination unit 67 for determining the location of a water ring and performing the corresponding image data process repeatedly until all the data in the image frame is processed.

Figure 7:
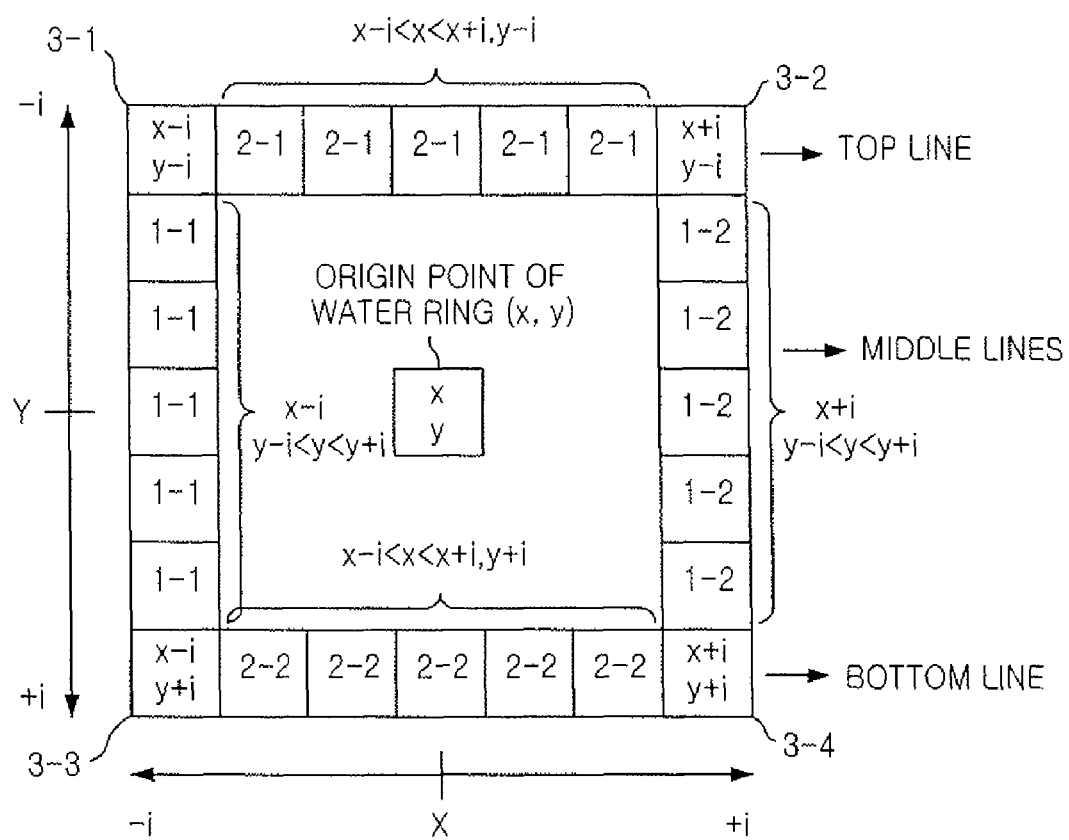
FIG. 7 is a diagram describing the image information location of a water ring that generated $i^{th}$ in a water ring scan order in accordance with the present invention.

FIG. 7 is a diagram describing the image information location of an $i^{th}$ generated water ring in a water ring scan order in accordance with the present invention.

Referring to FIG. 7, the determination and processing procedures of an origin point of a water ring of the water ring scanning apparatus and method described in FIGS. 6A and 6B will be described in detail, hereinafter.

The first step: the origin point of the water ring, i.e., water ring (0), is determined and the data corresponding to the location of the water ring (0) are processed.

(a) An arbitrary water ring origin point is determined (see the location marked (x, y), which is the origin point of the water ring). Here, the central part of an image frame to be transmitted, or other arbitrary point can be designated as an origin point of a water ring.

(b) The data at the origin point of the water ring determined above are processed, i.e., encoded in the encoder and decoded in the decoder.

The second step: the location of a water ring (i) is determined and the data in the location are processed.

(a) The location of a $i^{th}$ generated water ring (the number of pixels in a pixel based method, the number of the corresponding units in a block or macro block based method) from the origin point of the water ring is determined.

(b) The data located in the water ring (i) are processed, i.e., encoded in the encoder and decoded in the decoder.

The third step: The procedures from the second step are performed repeatedly until all the data in an image frame are processed.

As shown in FIG. 7, the water ring (i) consists of pixels, blocks or macro blocks located in 1-1, 1-2, 2-1, 2-2, 3-1, 3-2, 3-3, 3-4, and stands for a $i^{th}$ generated water ring from the origin point of the water ring, i.e., the water ring (0).

The location defined as 1-1 is the image data of all the pixels, blocks or macro blocks −i away on the x-axis from the origin point of the water ring and corresponding to locations smaller than ±i on the y-axis. When the origin point of the water ring is to be (x, y), 1-1 can be expressed as follows.

1-1: all data located in x−i and (y−i<y<y+i).

The location defined as 1-2 in the drawing is image data of all the pixels, blocks or macro blocks +i away on the x-axis from the origin point of the water ring and corresponding to locations smaller than ±i on the y-axis. When the origin point of the water ring is to be (x, y), 1-2 can be expressed as follows.

1-2: all data located in x+i and (y−i<y<y+i).

The location defined as 2-1 in the drawing is image data of all the pixels, blocks or macro blocks −i away on the y-axis from the origin point of the water ring and corresponding to locations smaller than ±i on the x-axis. When the origin point of the water ring is to be (x, y), 2-1 can be expressed as follows.

2-1: all data located in y−i and (x−i<x<x+i).

The location defined as 2-2 in the drawing is image data of all the pixels, blocks or macro blocks +i away on the y-axis from the origin point of the water ring and corresponding to locations smaller than ±i on the x-axis. When the origin point of the water ring is to be (x, y), 2-2 can be expressed as follows.

2-2: all data located in y+i and (x−i<x<x+i).

The locations defined as 3-1, 3-2, 3-3, 3-4 in the drawing is image data of all the pixels, blocks or macro blocks +i away on the x-axis from the origin point of the water ring and corresponding to locations smaller than ±i on the y-axis. That is, when the origin point of the water ring is to be (x, y), the location of 3-1 is (x−i, y−i), 3-2 being (x+i, y−i), 3-3 being (x−i, y+i) and 3-4 being (x+i, y+i).

In a water ring scan method, the data located in a water ring (i) are all pixel data (in case of being processed in an image domain such as wavelet), or data included in blocks or macro blocks (in case of being processed in DCT domain) as illustrated in FIG. 7, the processing procedures in a water ring (i) are as described in the following examples.

1. Example 1 of Processing Procedures in a Water Ring (i)

For data located in locations corresponding to a water ring (i), a water ring scan is performed from the data in the upper-left part towards those in the bottom-right part in order. The water ring scan divides the shape of a water ring into the top line, middle lines and bottom line as illustrated in FIG. 7, and is performed in order of left to right, top line to middle lines to bottom line. Referring FIG. 7, the processing procedure of a concrete first embodiment will be described hereinafter.

The data of the top line should be scanned. Here, the scanning is performed in order of 3-1 (x−i, y−i)==>2-1 (x−i<x<x+i,y−i)==>3-2 (x+i, y−i) from left to right.

The data of the middle lines should be scanned. The middle line data mean those data in the locations of 1-1 (x−i, y−i<y<y+i) and 1-2 (x+i, y−i<y<y+i). The scanning is performed left to right the data in the 1-1 line and those in the 1-2 done alternately, and when the scanning of a line is finished, the scanning is repeatedly performed from the top line to the bottom line until all data included in the middle lines are scanned. For instance, the scanning is repeated in a way 1-1 (x−i, y−i+1)==>1-2 (x+i, y−i+1)==>1-1 (x−i, y−i+2)==>1-2 (x+i, y−i+2)==>1-1 (x−i, y−i+3)==>1-2 (x+i, y−i+3)==> . . . ==>1-1 (x−i, y+i−1)==>1-2 (x+i, y+i−1).

The data of the bottom line should be scanned. Here, the scanning is performed from left to right in order of 3-3 (x−i, y+i)==>2-2 (x−i<x<x+i, y+i)==>3-4 (x+i, y+i).

An example embodying the first embodiment is as follows.

```
☐ Initial parameter
n : n'th Ring
N : number of MB in n'th Ring
prev_n : (n−1)'th Ring
start_x, start_y : start location of Ring
            (left_top X of Ring, left_top Y of Ring)
curr_x, curr_y : each location of MB in Ring
☐ Algorithm
Step 1 : Initial MB Fill
n = 1;
curr_x = start_x;
curr_y = start_y;
if ( InBoundary(curr_x, curr_y) )
    FillMB(start_x, start_y);
Step 2 : Top Line MB Fill
n++;
N = 2*n − 1;
prev_n = 2*(n−1) − 1;
start_x−−;
start_y−−;
curr_x = start_x;
curr_y = start_y;
for j=1 to N {
if( InBoundary(curr_x, curr_y) )
    FillMB(curr_x, curr_y);
    Curr_x++;
}
Step 3 : Middle Line MB Fill
N = prev_n;
for j=1 to N {
    curr_x = start_x;
curr_y = start_y + j;
if ( InBoundary(curr_x, curr_y) )
    FillMB(curr_x, curr_y);
    curr_x + prev_n + 1;
if ( InBoundary(curr_x, curr_y) )
        FillMB(curr_x, curr_y);
}
Step 4 : Bottom Line MB Fill
N = 2*n − 1;
curr_x = start_x;
curr_y = start_y + prev_n + 1;
for j=1 to N {
if ( InBoundary(curr_x, curr_y) )
        FillMB(curr_x, curr_y);
    curr_x++;
}
Step 5
if (not VOP Fill)
    goto Step 2.
else
    stop
```

2. Example 2 of the Processing Procedure in a Water Ring (i)

For data in locations corresponding to the water ring (i), the water ring scanning is performed in order of 3(3-1, 3-2, 3-3, 3-4)==>2-1==>1-1==>1-2==>2-2.

Scanning the locations of 3-1 (x−i, y−i), 3-2 (x+i, y−i), 3-3 (x−i, y+i), 3-4 (x+i, y+i) and processing the corresponding data, Scanning the location of 2-1 (x−i<x<x+i, y−i) and processing the corresponding data, Scanning the location of 1-1 (x−i, y−i<y<y+i) and processing the corresponding data, Scanning the location of 1-2 (x+i, y−i<y<y+i) and processing the corresponding data, Scanning the location of 2-2 (x−i<x<x+i, y+i) and processing the corresponding data.

3. Example 3 of the Processing Procedures in a Water Ring (i)

For data in locations corresponding to the water ring (i), the water ring scanning is performed in order of 2-1==>1-1==>1-2==>2-2==>3(3-1, 3-2, 3-3, 3-4).

- Scanning the location of 2-1 (x−i<x<x+i, y−i) and processing the corresponding data,
- Scanning the location of 1-1 (x−i, y−i<y<y+i) and processing the corresponding data,
- Scanning the location of 1-2 (x+i, y−i<y<y+i) and processing the corresponding data,
- Scanning the location of 2-2 (x−i<x<x+i, y+i) and processing the corresponding data,
- Scanning the locations of 3-1 (x−i, y−i), 3-2 (x+i, y−i), 3-3 (x−i, y+i), 3-4 (x+i, y+i) and processing the corresponding data.

4. Example 4 of the Processing Procedures in a Water Ring (i)

For data in locations corresponding to the water ring (i), the water ring scanning is performed in order of 2-1-==>2-2-==>1-1==>1-2==>3(3-1, 3-2, 3-3, 3-4).

- Scanning the location of 2-1 (x−i<x<x+i, y−i) and processing the corresponding data,
- Scanning the location of 2-2 (x−i<x<x+i, y+i) and processing the corresponding data,
- Scanning the location of 1-1 (x−i, y−i<y<y+i) and processing the corresponding data,
- Scanning the location of 1-2 (x+i, y−i<y<y+i) and processing the corresponding data,
- Scanning the locations of 3-1 (x−i, y−i), 3-2 (x+i, y−i), 3-3 (x−i, y+i), 3-4 (x+i, y+i) and processing the corresponding data.

5. Example 5 of the Processing Procedures in a Water Ring (i)

For data in locations corresponding to the water ring (i), the water ring scanning is performed in order of 1-1==>1-2==>2-1==>2-2==>3(3-1, 3-2, 3-3, 3-4).

- Scanning the location of 1-1 (x−i, y−i<y<y+i) and processing the corresponding data,
- Scanning the location of 1-2 (x+i, y−i<y<y+i) and processing the corresponding data,
- Scanning the location of 2-1 (x−i<x<x+i, y−i) and processing the corresponding data,
- Scanning the location of 2-2 (x−i<x<x+i, y+i) and processing the corresponding data,
- Scanning the locations of 3-1 (x−i, y−i), 3-2 (x+i, y−i), 3-3 (x−i, y+i), 3-4 (x+i, y+i) and processing the corresponding data.

Figure 8A:
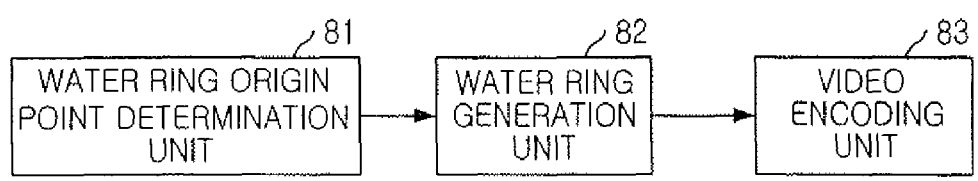
FIG. 8A is a structural diagram illustrating an image encoding device using water ring scan order in accordance with an embodiment of the present invention.

In the mean time, the method and apparatus used for applying the water ring scan order to coding of an image or moving picture can be divided into a water ring origin point determination unit 81 and a water ring generation unit 82, and an image coding unit 83 for processing the corresponding data in the water ring location as illustrated in FIG. 8A. The method and apparatus used for applying the water ring scan order to decoding of an image or a moving picture can be divided into a water ring origin point determination unit 84, a water ring generation unit 85, and an image decoding unit 86 for processing the corresponding data in the location of the water ring as illustrated in FIG. 8B.

Figure 8B:
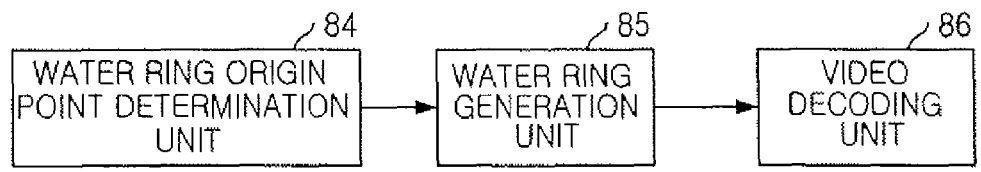
FIG. 8B is a structural diagram illustrating an image decoding device using water ring scan order in accordance with an embodiment of the present invention.

FIG. 8A is a structural diagram illustrating an image encoding device using water ring scan order in accordance with an embodiment of the present invention and FIG. 8B is a structural diagram illustrating an image decoding unit using a water ring scan order in accordance with an embodiment of the present invention.

Of the water ring origin point determination units 81 and 84, the one at the encoder determines the arbitrary location at which a water ring is generated, and performs the function of transmitting the coordinates of the origin point of the watering to the decoder. The water ring origin point determination unit 84 on the decoder part determines the location of the water ring to be generated in the image frame based on the coordinates transmitted from the encoder. Meanwhile, in case the origin point of the water ring has been determined in advance to put it on the central part of the image frame by the encoder and the decoder, this function of the determination units are to be skipped.

The water ring generation units 82, 85 take the role of generating the $i^{th}$ water ring, i.e., a water ring (i), using the various method of making water rings, and informing the image coding unit (or image decoding unit) of the location the water ring (i) generates so that the image coding unit (or the image decoding unit) can perform coding (or decoding) of the corresponding image frame.

The image coding unit (or the image decoding unit) processes the image data of the coordinates determined at the water ring generation units 82, 85.

Figures 9A, 9B:
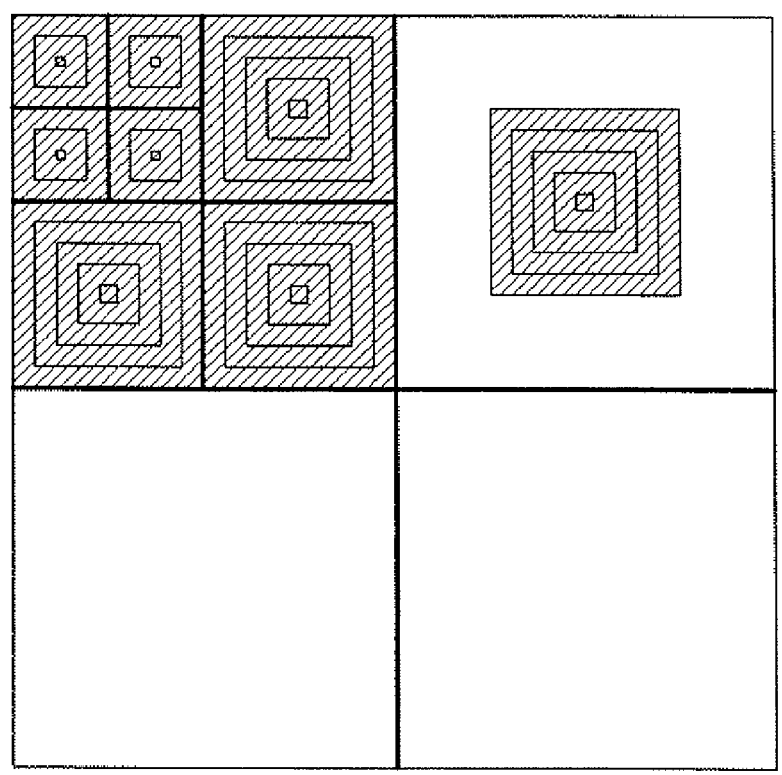
FIG. 9A is an exemplary view describing the concept of applying water ring scan order to an image encoding method using DCT.
FIG. 9B is an exemplary view illustrating the concept of applying water ring scan order to an image encoding method using wavelet conversion.

Referring to FIGS. 9A and 9B, examples of applying the water ring scan order of the present method to coding actually will be described hereinafter.

FIG. 9A is an exemplary view describing the concept of applying water ring scan order to an image encoding method using the DCT and FIG. 9B is an exemplary view illustrating the concept of applying water ring scan order to an image encoding method using wavelet conversion.

In case of the coding method using the DCT, the coding of an image is performed by generating water rings on an 8×8 block basis, or a 16×16 macro block basis. In case of the coding method based on the pixel using wavelet conversion and so on, the coding of an image is performed by generating water rings on a pixel basis.

FIG. 9A is an example of applying the water ring scan order to treating of moving pictures based on the DCT When applying it to the QCIF (176×144 pixels) image frame, there are 11×9 macro blocks (16×16). An example applying it to coding by generating water rings on a macro block unit from the macro block located in the central part of the image frame. With six water rings generated from the origin point, i.e., from a water ring (0), a water ring (1), . . . , to a water ring (5), the entire image is coded. In case not all data have been received due to the limitation of the bandwidth of the delivery layers at the decoder, the data in macro blocks of the central part of the image frame from the water ring (0) to the water ring (1), etc., are highly likely to be received and decoded because they are transmitted with priority. So, although the data of the macro blocks in the fringe area are not processed, the quality of the image in the central part is secured improved.

FIG. 9B is an example of applying the water ring scan order to the image coding method using wavelet conversion, which applies it to coding of an image by generating water rings from the center of the subband on a pixel basis on the image corresponding to each subband. The drawing shows an example in which the subband in the upper-right part is coded with water rings having generated thereon but due to the limitation of the bandwidth of the delivery layers, not all the data of the entire image are processed, processing the image data in the central part of the image frame only.

In the meantime, as an example of the scalable moving picture coding, a case applying the water ring scan order to the micro granular scalable (FGS) coding are described as follows.

There are two examples offered. One focuses on the location where a water ring generates and on processing the data there, while the other example focuses on performing the procedures for determining where to generate the water ring and for processing the data at the water ring.

The first example shows a case of having, when performing the bit-plane VLC or decoding on a bit-plane basis, the procedures of performing a water ring scan at an arbitrary location, determining the location of a block or a macro block to be coded or decoded first, and processing the image information on the block or the macro block as soon as its location is determined both at the encoder and the decoder.

Figure 10A:
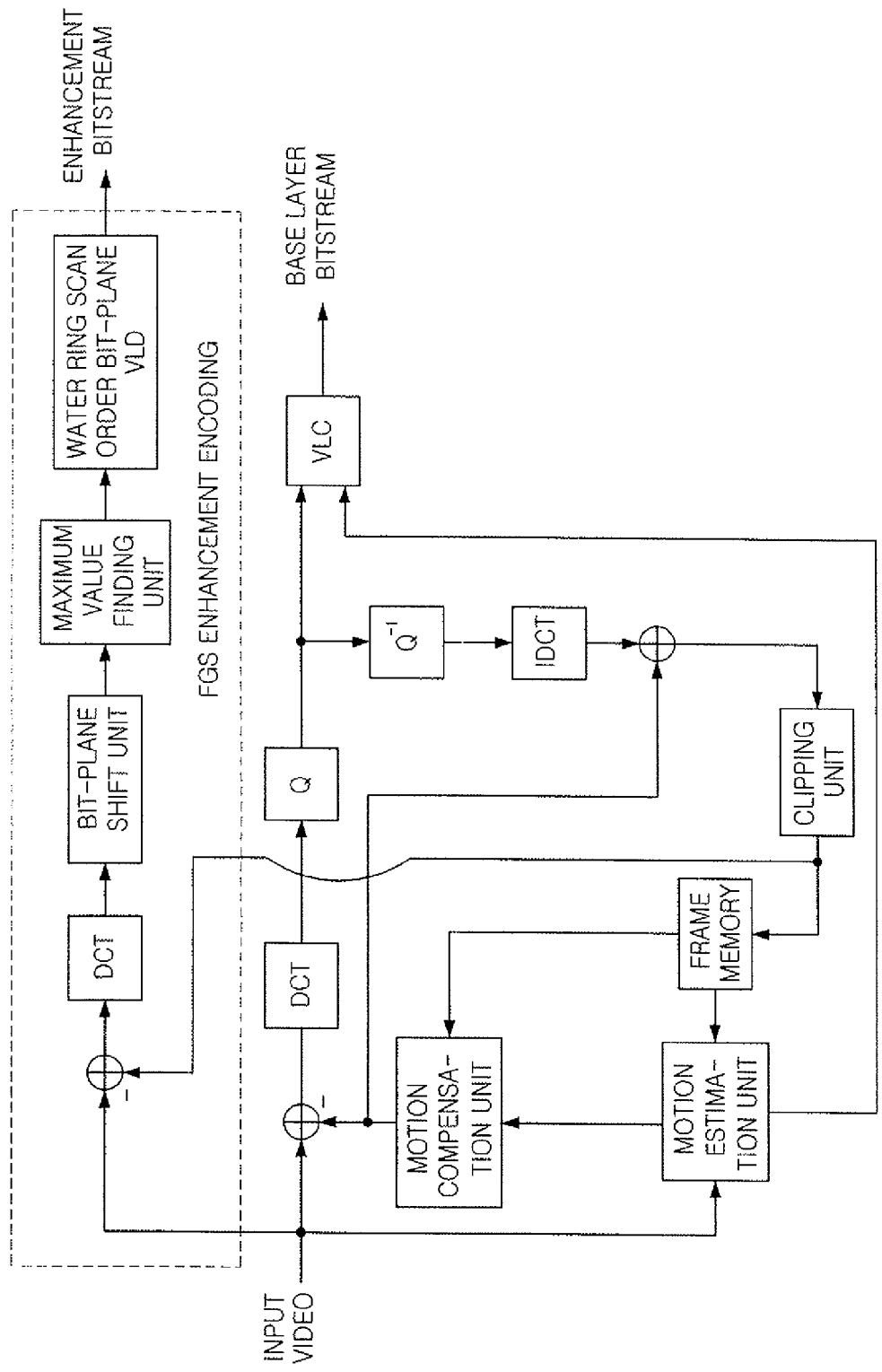
FIG. 10A is a structural diagram showing an encoder of a fine scalable coding method applied with water ring scan order in accordance with an embodiment of the present invention.
Figure 10B:
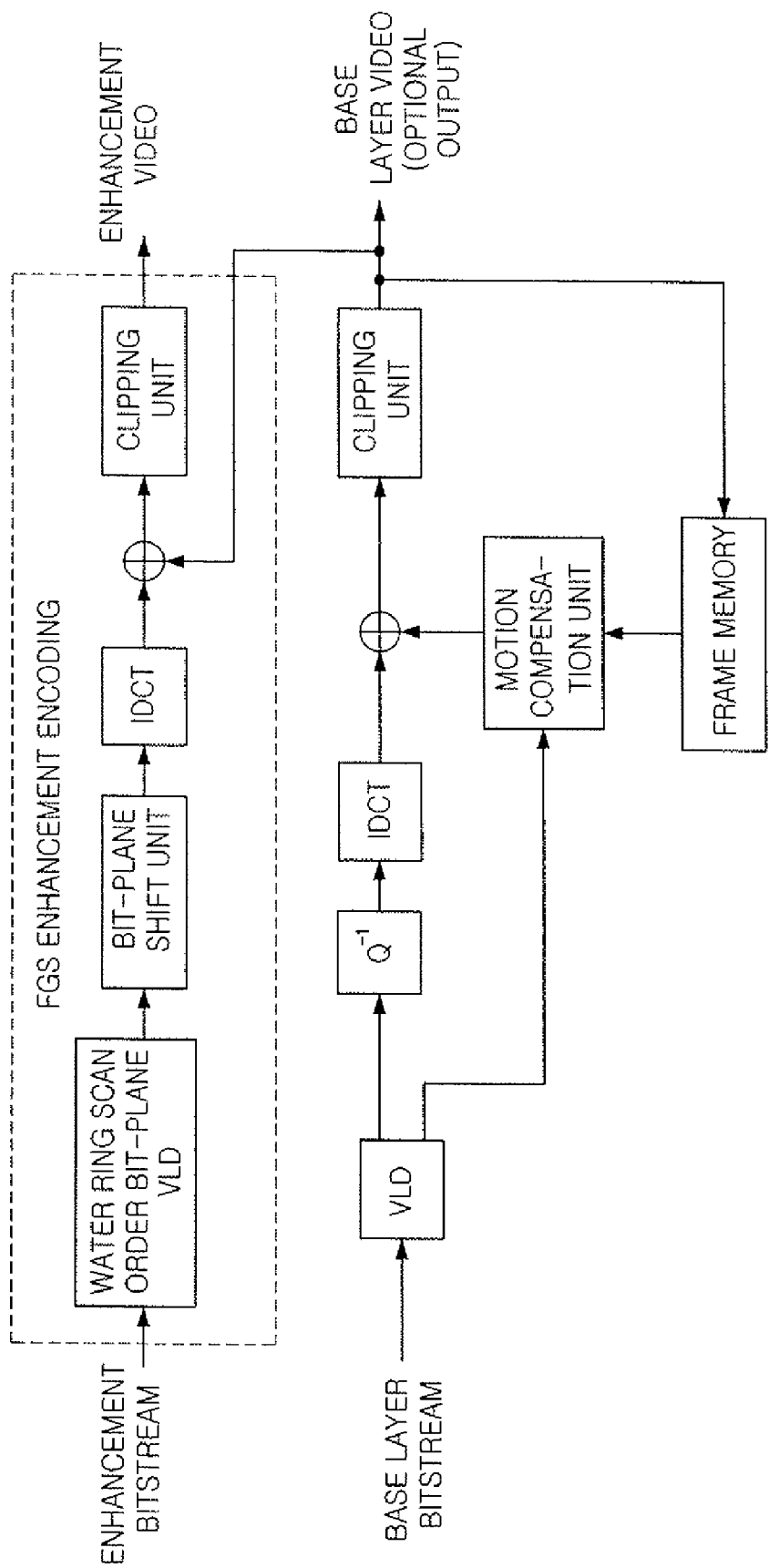
FIG. 10B is a structural diagram showing a decoder of a fine scalable coding method applied with water ring scan order in accordance with an embodiment of the present invention.

FIG. 10A is a structural diagram showing an encoder of a fine scalable coding applied with a water ring scan order in accordance with an embodiment of the present invention, and FIG. 10B is a structural diagram showing a decoder of a fine scalable coding applied with water ring scan order in accordance with an embodiment of the present invention.

As illustrated in FIG. 10A, the FGS enhancement layer encoding is performed through the procedures of obtaining residues between an original image and an image restored in the base layer, performing a discrete cosine transform (DCT), doing bit-plane shift, finding the maximum value, and performing the bit-plane VLC properly to the water ring scan order when carrying it out (i.e., a procedure of performing the bit-plane VLC in accordance with the water ring scan order).

In the procedure of obtaining the residues, the residues are acquired by obtaining the difference between the original image and the image restored after being coded in the base layer.

In the procedure of performing the DCT, the residues obtained in the previous step are converted into a DCT domain with a block(8×8)-based DCT.

Here, if there is a block that optionally needs to have quality image, the data corresponding to it should be transmitted on a top priority and the bit-plane shift should be performed optionally for this. This is called selective enhancement and performed in the bit-plane shift procedure.

In the procedure of finding the maximum value, the maximum value of all the values having gone through the DCT (Discrete Cosine Transform) is obtained based on their absolute values. This value is used to obtain the number of maximum bit-planes for transmitting the corresponding image frame.

In the procedure of the bit-plane VLC according to the water ring scan order, when performing bit-plane VLC based on a bit-plane, the procedures of performing a water ring scan from a certain location and determining the location of a block or a macro block to be coded with priority, inputting 64 DCT coefficients (the bit of a corresponding bit-plane of a DCT coefficient: 0 or 1) obtained from each block according to the determined coding order (i.e., the priority order) in order of zigzag scan into a matrix, and performing run-length coding on them in accordance with the VLC table are done at the same time. Other coding procedures of the base layer are the same as those of conventional techniques so they will not be described herein.

As depicted in FIG. 10B, the decoding of the FGS enhancement layer carries out the decoding of bitstreams transmitted to the enhancement layer in the reverse order of the encoder. The decoding includes the procedures of performing the bit-plane variable length decoding (VLD) on the inputted enhancement bitstreams from the origin point of the water ring agreed (a location transmitted from the encoder to start from the origin point, or a location agreed in advance: such as the central block or the central macro block of an image frame) with the encoder, along the water ring scan order, if the location of a block to have quality image optionally is transmitted, performing the bit-plane shift optionally, performing the IDCT (Inverse Discrete Cosine Transform) on the value which is obtained by performing the bit-plane VLD and the shift optionally and restoring the image transmitted from the enhancement layer, and by combining it with the image decoded from the base layer and clipping the values into ones between 0 and 255, restoring the image finally improved. Other decoding procedures of the base layer are the same as those of conventional techniques so they will not be described herein.

In the mean time, the second example applying water ring scan order to the fine granular scalable (FGS) coding as an example of a scalable moving picture coding are as follows. This differs from the first example in that it performs the procedure of determining an origin point of a water ring and the procedure of processing the corresponding data in the origin point of the water ring.

Here, when performing the fine granular scalable coding, the encoder determines a location where a water ring is to be generated by using water ring scan, arrays the image information to be coded in the buffer in order of generation and performs the bit-plane VLC in the order arrayed in the buffer, while the decoder performs the bit-plane VLD, rearrays the location of the restored image information by using water ring scan order and performs the bit-plane shift and the IDCT.

Figure 11A:
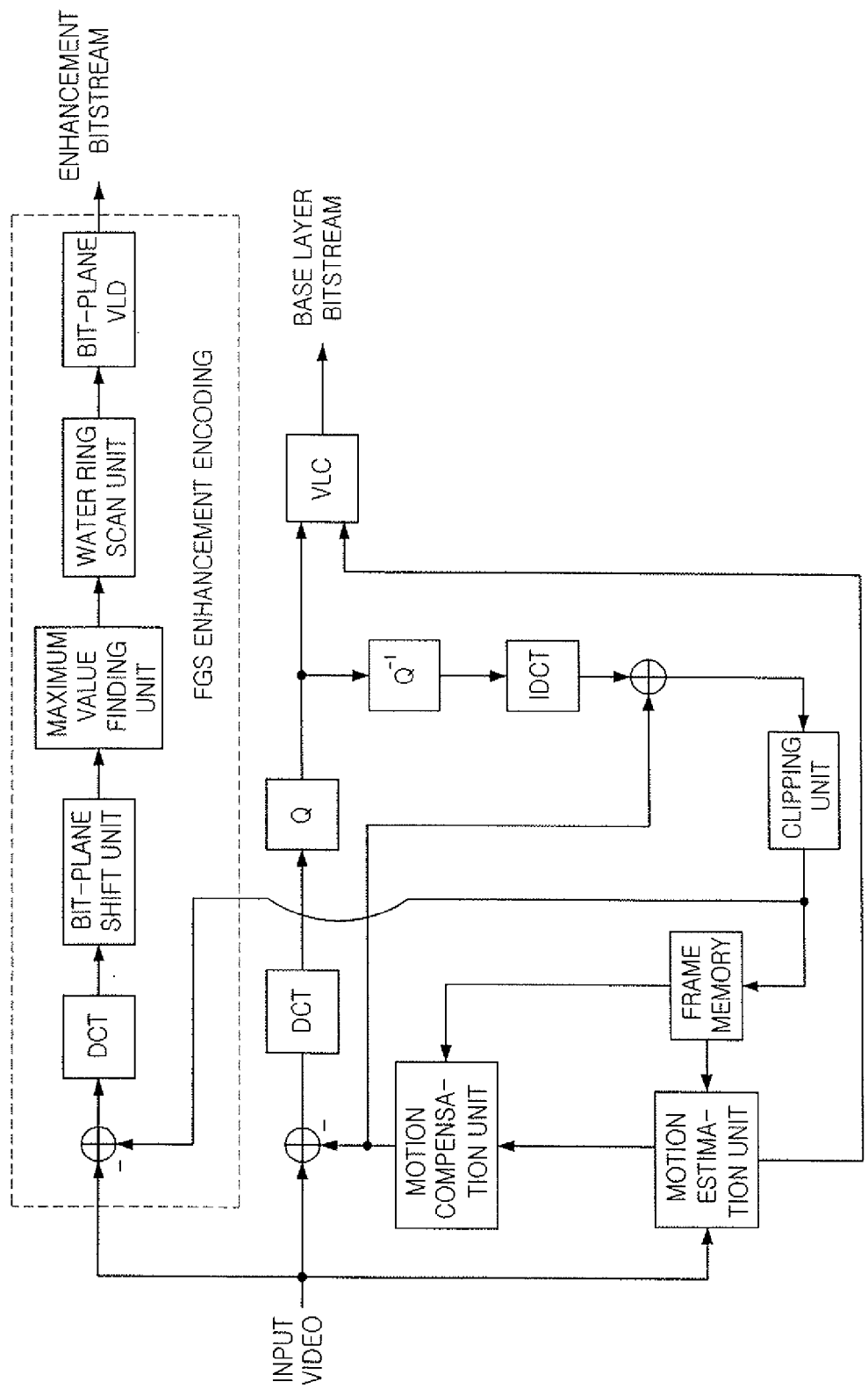
FIG. 11A is a structural diagram showing an encoder of a fine scalable coding method applied with water ring scan order in accordance with another embodiment of the present invention.
Figure 11B:
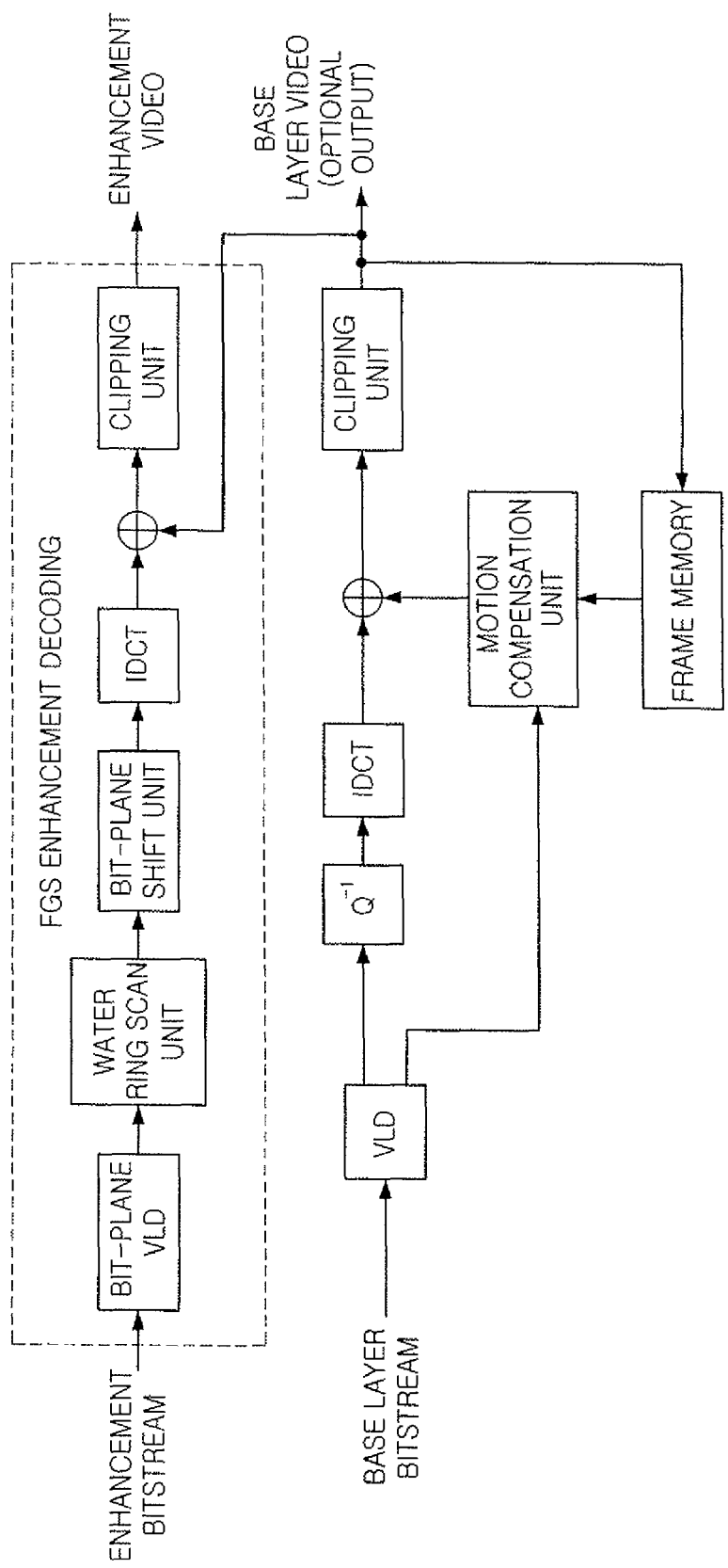
FIG. 11B is a structural diagram showing a decoder of a fine scalable coding method applied with water ring scan order in accordance with another embodiment of the present invention.

FIG. 11A is a structural diagram showing an encoder of a fine scalable coding method applied with water ring scan order in accordance with another embodiment of the present invention, and FIG. 11B is a structural diagram showing a decoder of a fine scalable coding method applied with water ring scan order in accordance with another embodiment of the present invention.

As illustrated in FIG. 11A, the encoding in the FGS enhancement layer includes the procedures of obtaining the residues between the original image and the image restored in the base layer, performing the DCT, carrying out bit-plane shift, finding the maximum value, reconstructing the image information in the image frame along the bit-plane water ring scan order, and performing the bit-plane VLC.

In the procedure obtaining the residues, the residues are obtained by acquiring difference between the original image and the image restored after coded in the base layer.

In the procedure performing the DCT, the image-based residues obtained in the previous step are converted to the DCT domain with a block(8×8)-based DCT.

Here, if a block having quality image optionally is needed, the corresponding values should be transmitted prior to the others, and the bit-plane shift can be performed for this. This is called selective enhancement and carried out in the bit-plane shift procedure.

In the procedure of finding the maximum value, the largest value of the values having gone through the DST based on their absolute values. These are used to obtain the number of the maximum bit-planes for transmitting the corresponding image frame.

In the procedure of water ring scan, a block or macro block to be coded is determined by performing water ring scan from a certain location and the image information of each bit-plane in an image frame are rearrayed according to the determined coding order.

In the procedure of the bit-plane VLC, when performing the bit-plane VLC on the image information rearrayed on a certain buffer during the water ring scan, 64 DCT coefficients (the bit of a corresponding bit of a DCT coefficient: 0 or 1) obtained on a block basis per bit-plane are inputted in a matrix in the order of a zigzag scan and each matrix is run-length encoded according to the variable length code table (VLC table). Other procedures are the same as those of conventional techniques so they will not be described herein.

Figure 1A:
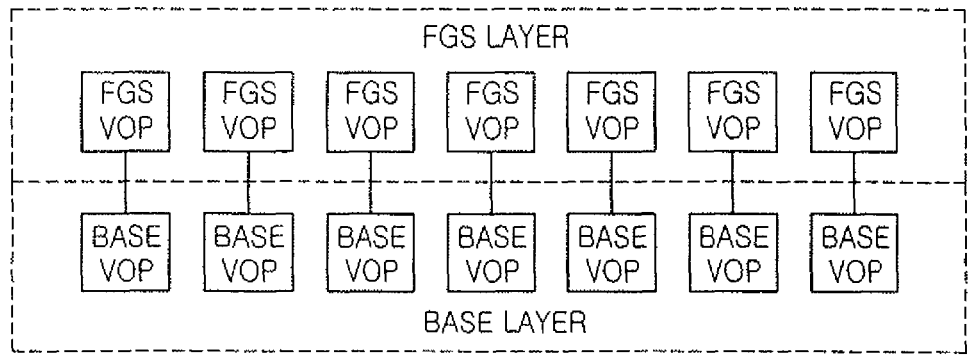
FIG. 1A is a structural diagram of the conventional basic fine granular scalability (FGS) coding method in accordance with an embodiment of the present invention.
Figure 1B:
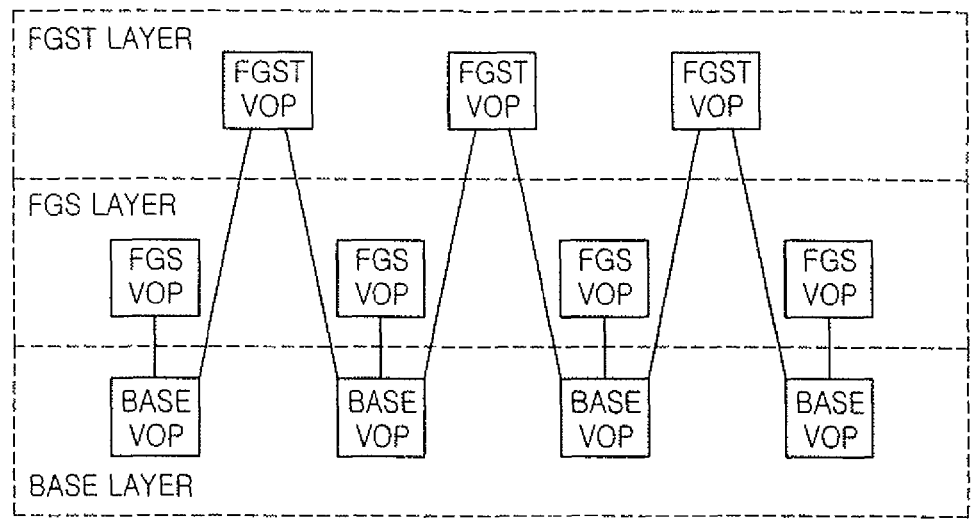
FIG. 1B shows a structural diagram of the conventional fine granular scalability (FGS) coding method with two improvement steps of FGS and FGST (Fine Granular Scalability Temporal) in accordance with an embodiment of the present invention.
Figure 1C:
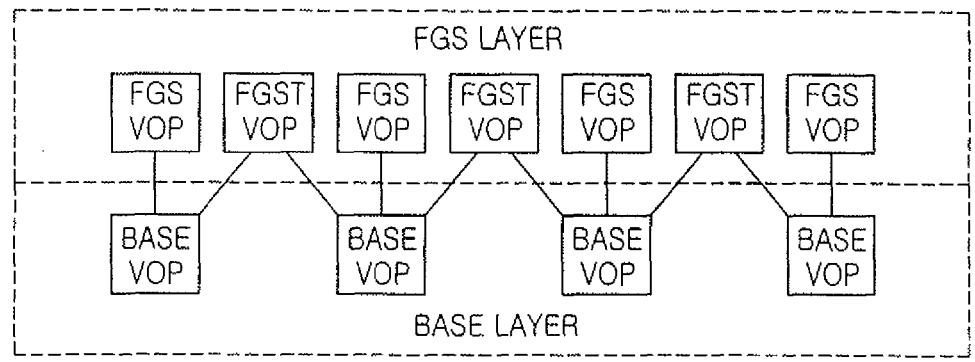
FIG. 1C represents a structural diagram of the conventional fine granular scalability (FGS) coding method with an enhancement step in which FGS and FGST are integrated in accordance with an embodiment of the present invention.
Figure 2A:
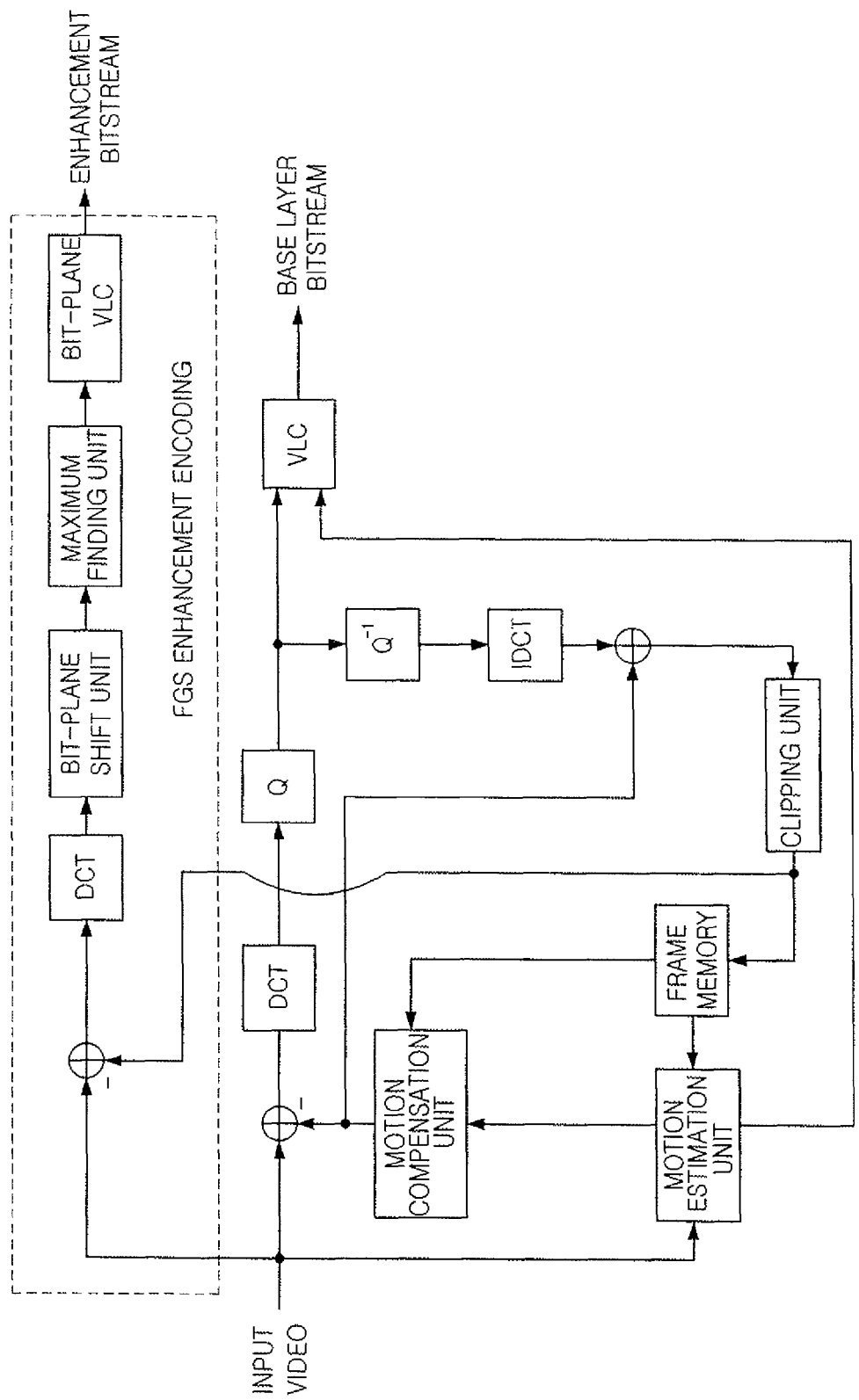
FIG. 2A is a structural diagram depicting an encoding part of the conventional fine granular scalability (FGS) coding method in accordance with an embodiment of the present invention.
Figure 2B:
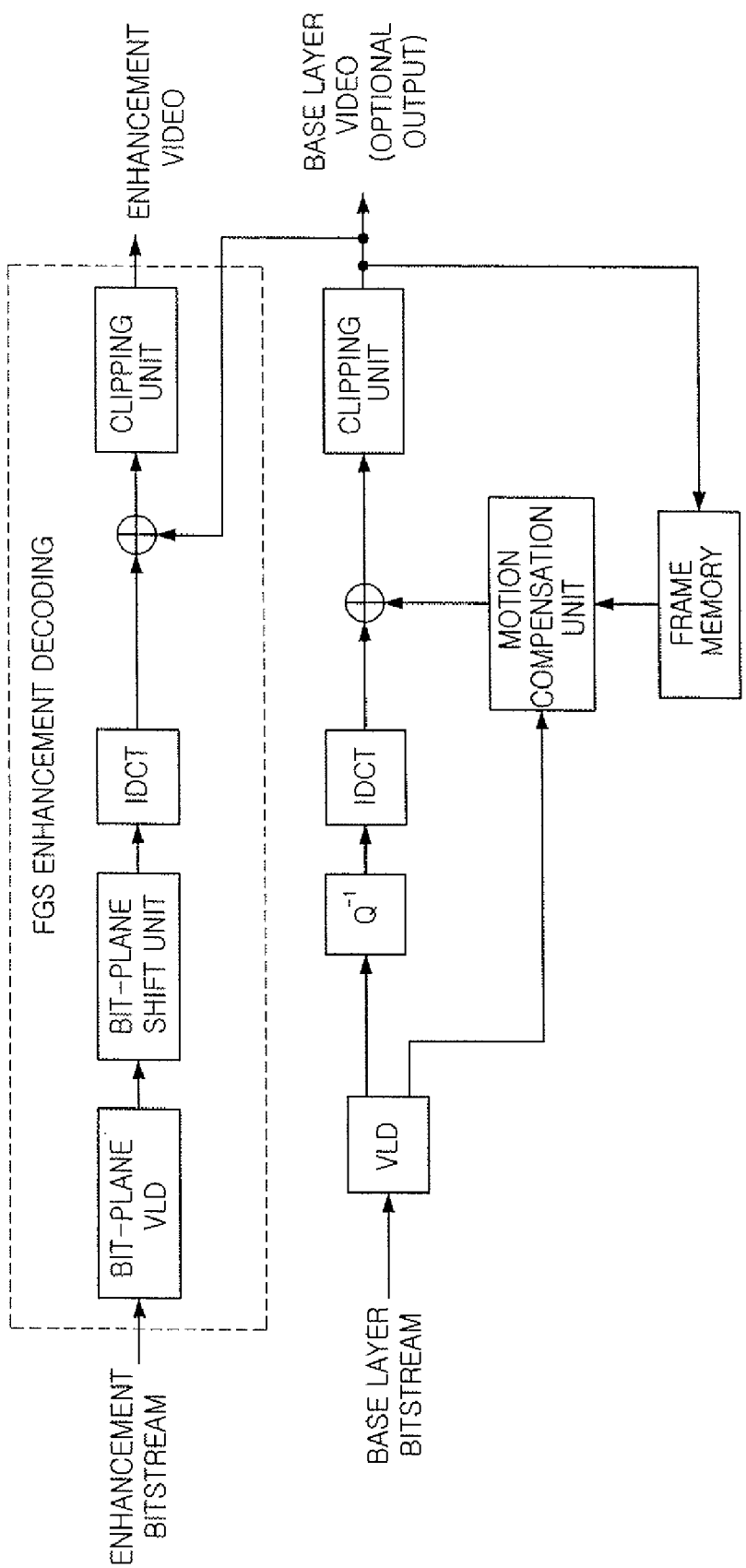
FIG. 2B is a structural diagram depicting a decoding part of the conventional fine granular scalability (FGS) coding method in accordance with an embodiment of the present invention.
Figure 3A:
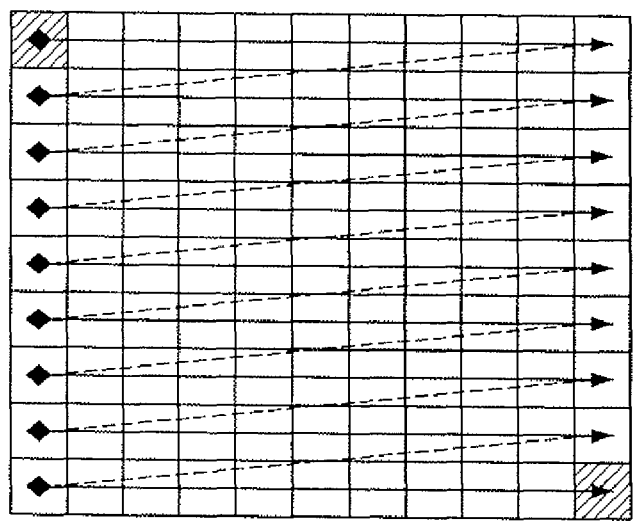
FIG. 3A is an exemplary view illustrating a normal scan order in a conventional image and moving picture coding method using DCT.
Figure 3B:
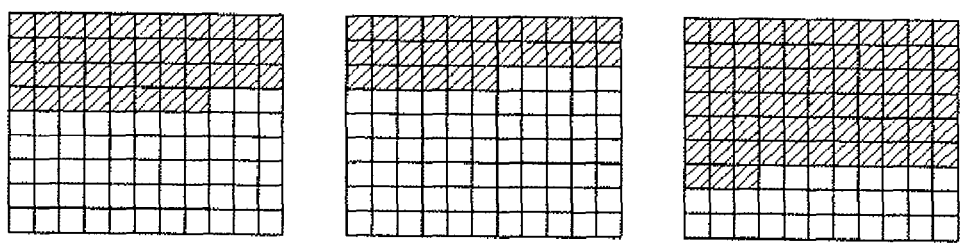
FIG. 3B is an exemplary view depicting a conventional normal scan order applied to a scalable coding method.
Figure 4:
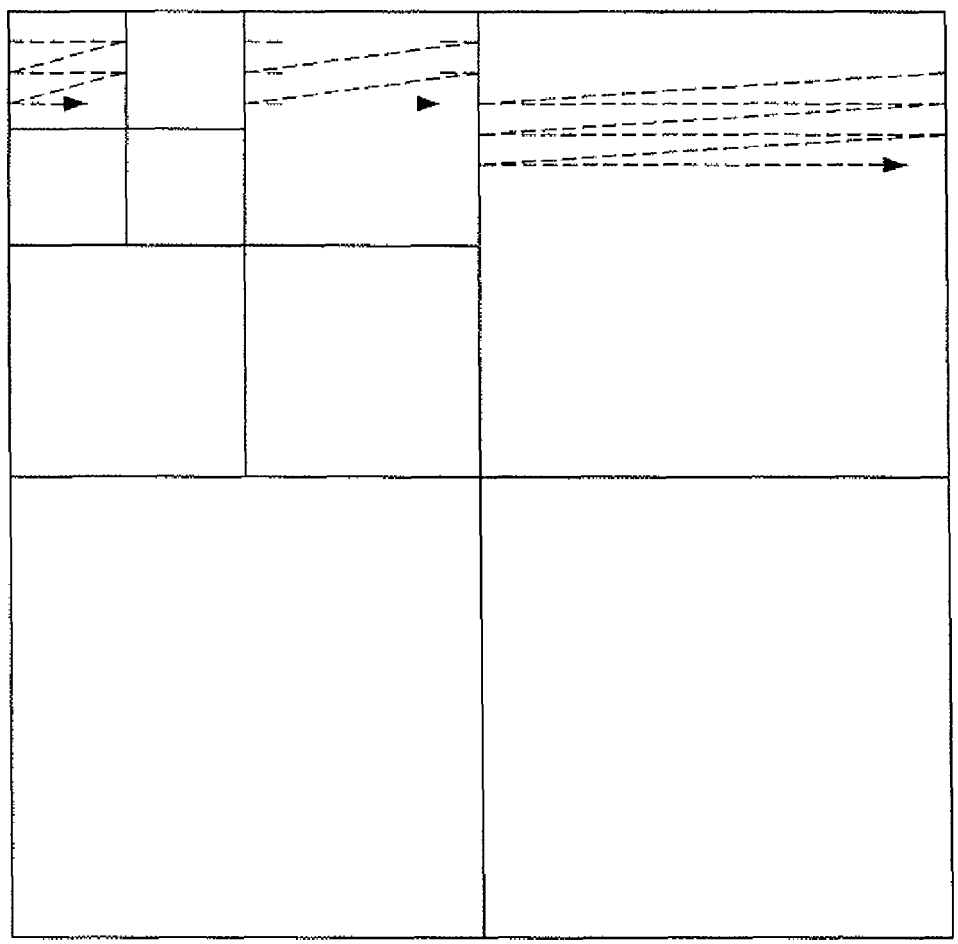
FIG. 4 is another exemplary view showing a conventional normal scan order applied to a scalable coding method.

As described in FIG. 1B, the decoding of the FGS enhancement layer carries out the decoding of bitstreams transmitted to the enhancement layer in the reverse order of the encoder. The decoding includes the procedures of performing the bit-plane variable length decoding (VLD) on the inputted enhancement bitstreams, rearraying the image data transmitted from the origin point of the water ring agreed (a location transmitted from the encoder to start from there, or a location agreed in advance: such as the central block or the central macro block of an image frame) with the encoder along the water ring scan order, if the location of a block to have quality image optionally is transmitted, performing the bit-plane shift optionally, performing the block(8×8)-based IDCT (Inverse Discrete Cosine Transform) on the value which is obtained by the procedure of performing the bit-plane VLD and the shift optionally and thus restoring the image transmitted from the enhancement layer, and by combining it with the image decoded from the base layer and clipping the values into ones between 0 and 255, restoring the image finally improved. Other procedures of decoding in the base layer are the same as those of conventional techniques so they will not be described herein.

Figure 12:
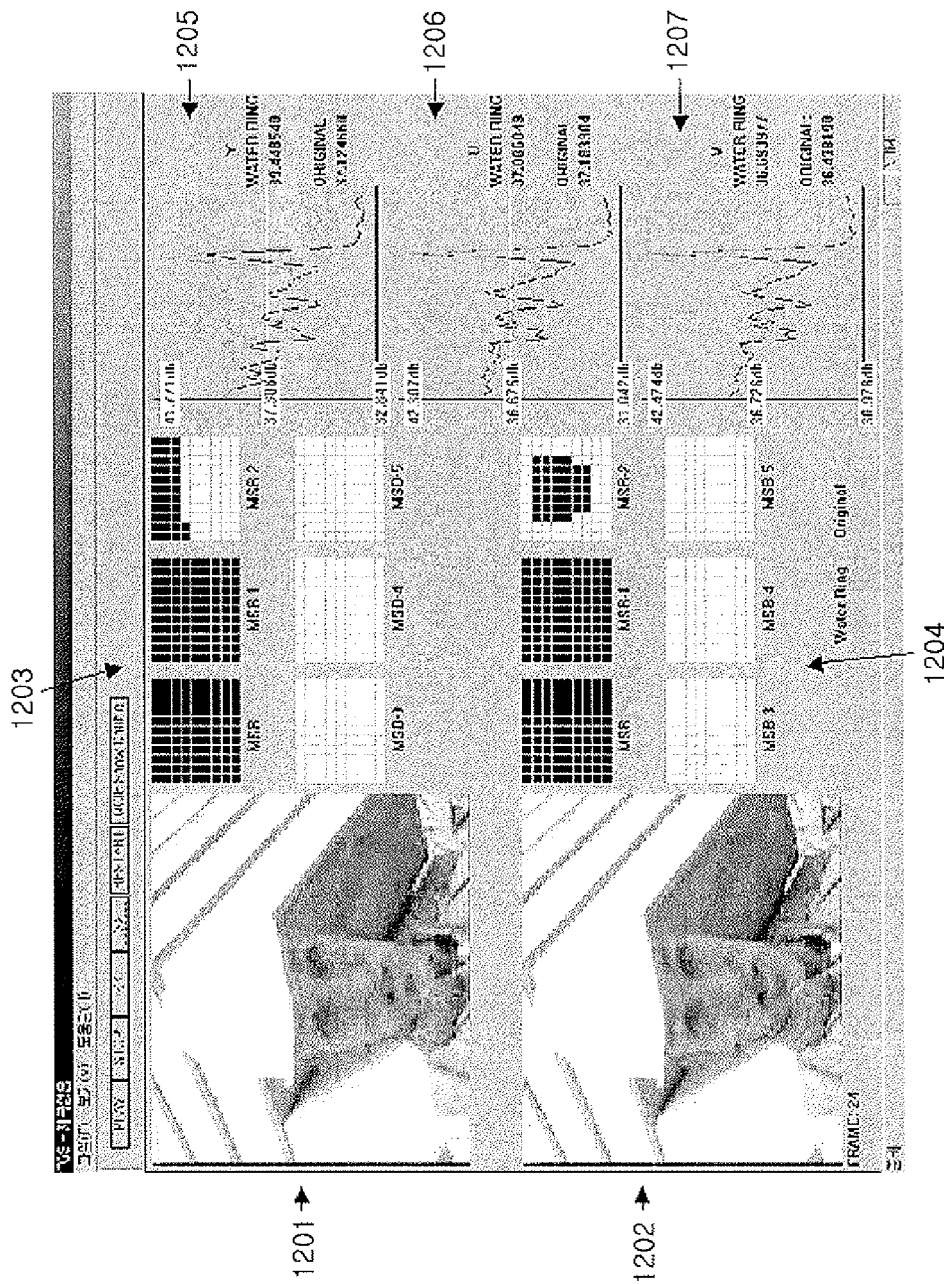
FIG. 12 is an exemplary view of an actual test result depicting an MPEG-4-based fine scalable coding method joined with water ring scanning method.

FIG. 12 is an exemplary view of an actual test result depicting an MPEG-4-based fine scalable coding method joined with water ring scanning method.

The two pictures in the drawing shows images restored When it is assumed that a foreman image sequence, which is mainly used in an MPEG-4 standardization convention, is coded in the OCIF class (176 pixel×144 pixel), i.e., 5 frames per second and transmitted, and the bitstreams of the base layer having been transmitted at the speed of 16 kbps, on the other hand, although all the enhancement bitstreams of the enhancement layer have been coded and sent out, only a total of 48 kbps bitstreams of them are received at the decoder due to the limitation of the delivery layer bandwidth. The drawing captures the image of the $24^{th}$ frame of the foreman sequence.

In the drawing, the picture marked 1201 is an image restored through the MPEG-4 fine granular scalable coding, while the one marked 1202 is an image obtained by performing the MPEG-4 fine granular scalable coding method with water ring scan added thereto.

To take a look at the face of the foreman, it is obvious that the image 1202 shows better quality that the image 1201. To be more objective, graphs are presented to compare both images by using the peak signal to noise ratio (PSNR). The 1205 is a graph showing the PSNR with respect to the luminance Y, while 1206 and 1207 are graphs showing the PSNR on the chrominance U, V. Here, it is observed that the PSNR of the method using the water ring scan is about 2.32 dB higher. In the drawing, the water ring scan method is marked Water Ring, its result being 39.448540 dB while the original method is marked Original, its result being 37.1246600 Db.

Considering the visual system of a human being, the PSNR is calculated in the central part of the image.

As actually observed in the drawing, subjectively and objectively alike, the FGS coding method with the water ring scan method applied thereto turns out to be of better quality than the original FGS method. What caused quality difference of the image is described in the pictures marked 1203 and 1204.

In the drawing, the picture 1203 represents a macro block decoded on a bit-plane basis in the original FGS method, resulting from a decoder receiving a total of 48 Kbps due to the limitation of the delivery layer bandwidth and performing decoding with image information that has been received. Accordingly, the image information of the most significant bit (MSB), which is indicated as MSB in the drawing 3, and the second most significant bit, which is marked MSB-1 in the drawing 3, are completed with coding (filled up with black). But for the data of the MSB-2 bit-plane, only a third of them are completed with decoding (the white cells are where decoding has not been performed because their data are not received). When thinking of the human visual system and appreciate the whole image frame subjectively, the quality of this image feels relatively worse. This is because the quality of the image has been improved in the fringe part where a human being does not recognize notably i.e., the outskirt part of the image, not the face of the foreman.

On the contrary, the FGS coding method using the water ring scan method shows a macro block completed with decoding in the picture marked 1204 of the drawing. The bit-planes of the MSB and the MSB-1 are all decoded in the same way of the original method. Here, too, the image information of the MSB-2 bit-plane is partially decoded. But this one presents a result of performing encoding and decoding from the central part of the image frame and processing image information of a macro block located in the central part, suitably to the human visual system. As seen in the picture marked 1202 of the drawing, the image quality in the central part is relatively better, which confirms the superiority of the water ring scan method.

Applying the water ring scan order suitably to the human visual system, this method performs and transmits encoding from the central part of the image frame (or a certain arbitrary location), decodes in the central part of the image frame (or a certain arbitrary location) at the decoder so that quality image can be restored always in the central part of the image frame (or in a certain location) even when bitstreams transmitted from the encoder are not received any more due to the limitation of the delivery layer bandwidth.

However, the present method is designed to encode and decode macro blocks from the upper-left part to the bottom-right part in order. So, in case not all the bitstreams are received due to the limitation of the delivery layer bandwidth, the bitstreams of the fringe part of the image frame are processed, not securing the quality of the central part of the image frame, which leads to restoring image unsuitably to the human visual system.

Figure 13:
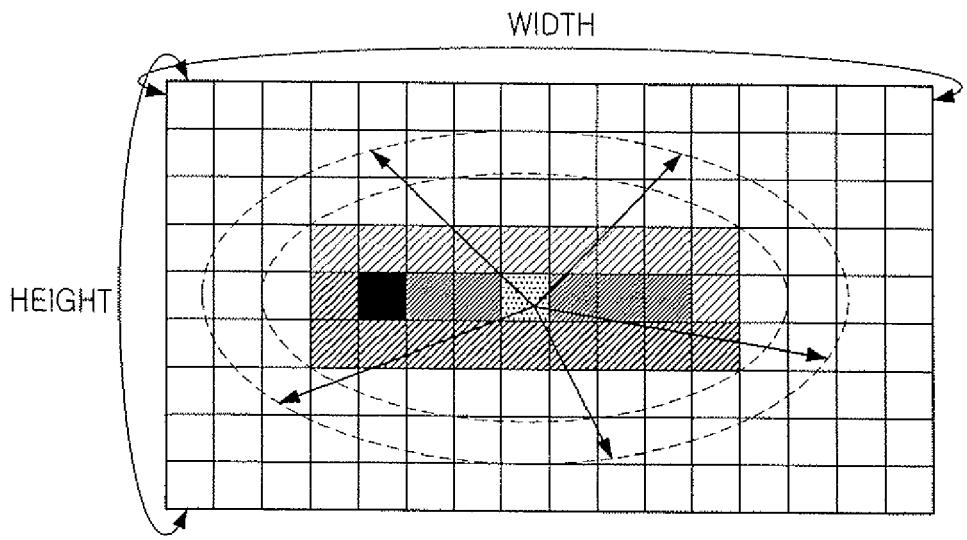
FIG. 13 is a conceptual diagram describing the principle of water ring scan order for 16:9 display ratio in accordance with another embodiment of the present invention.

Referring to FIG. 13, another embodiment applying the water ring scan order to the screen ratio of 16:9 is described herein.

FIG. 13 is a conceptual diagram describing the principle of water ring scan order for 16:9 display ratio in accordance with another embodiment of the present invention.

The processing procedures of a water ring (i), in an arbitrary central water ring scan order for the 16:9 screen ratio are as follows.

The water ring begins decoding from the core of the central point of an arbitrary water ring. When the macro block in the very center is given as an arbitrary center (x, y), the macro block where encoding starts becomes the start point and the encoding proceeds to the right including the macro block marked 1301 and the macro block in the center. After the decoding of the core part finishes the macro block in the top and right part begins to be encoded, and then the macro block marked 1303 in the left and bottom part does. The macro blocks 1302 and 1303 performs encoding repeatedly until all the macro blocks in the frame are encoded like waving water from the central point.

The location of the starting point differs to the screen ratio. As shown in the below formula, the starting point is put in the half of the difference value obtained by subtracting the number of width-length macro blocks (MB) and the number of height-length macro blocks from the given starting point. For instance, when it is supposed that there are 16 macro blocks in the width-length and 9 in the height-length and the starting point is given to be (7, 4), the starting point of encoding is to be (4, 4).

$$Sx = \left(x - \left(\frac{|Width - Height|}{2}\right)\right)$$
$$Sy = (y)$$

The macro block where encoding begins is (Sx, Sy), and the W=|Width−Height| number of MBs in the right that includes the starting point and an arbitrary point is called core, the encoding being performed to the right in order.

The encoding is carried out on the core, and then on the water rings around it after checking if the whole blocks are encoded. In case it is not check if all the blocks are encoded, four times of the work amount becomes overhead.

The encoding is performed in order from the macro block marked 1302 in the top and right line to the one marked 1403 in the bottom and left line), and the encoding is always done from left to right in order in each line.

Figure 14:
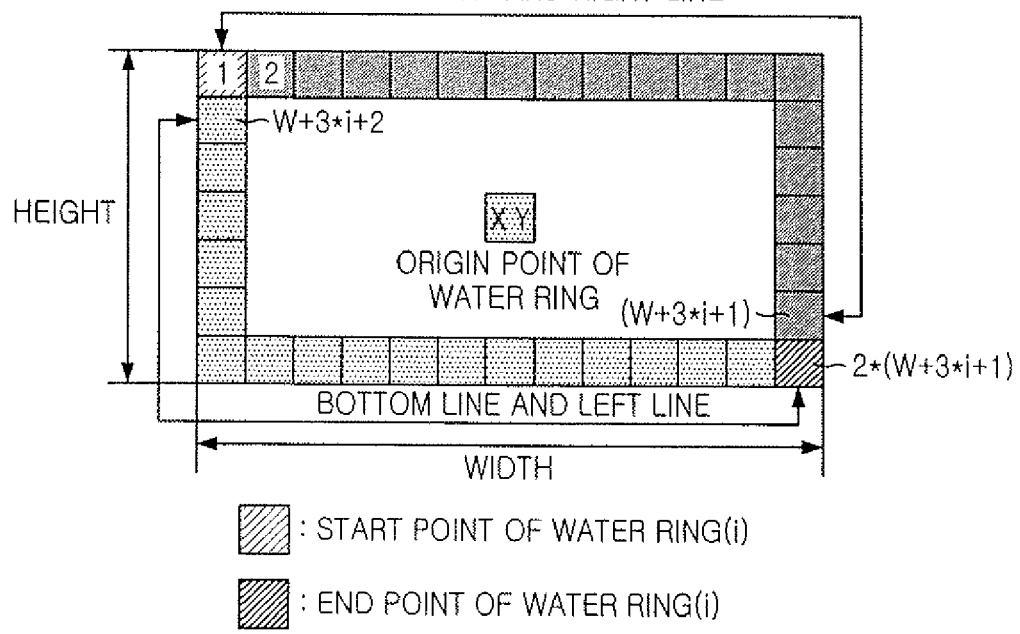
FIG. 14 is a diagram describing the $i^{th}$ water ring in water ring scan order of 16:9 display ratio in accordance with another embodiment of the present invention.

FIG. 14 is a diagram describing the $i^{th}$ water ring in water ring scan order of 16:9 display ratio in accordance with another embodiment of the present invention.

After the encoding on the $i^{th}$ water ring, the encoded is performed on the macro block determined as the start point, i.e., the start point of the $i^{th}$ water ring, and on the top line from left to right in order up to the W+i−1 number of the macro blocks, and then on the right line from up to down up to a total of W+3*i+1 macro blocks.

After that, it is checked if all the blocks are encoded and the encoding goes on to be performed on the bottom and left lines. In an $i^{th}$ water ring, encoding is carried out on a block marked W+3*i+2, followed by i number of macro blocks downward from it in the left line. And then in the $i^{th}$ water ring, from the macro blocks right below to the right, a total of 2*(W+3*i+1) number of macro blocks are coded in the bottom line.

An actual embodiment of the water ring scan method in a 16:9 screen ratio is as follows.

Initial Parameter
Width: The number of MBs in Width of Map
Height: The number of MBs in Height of Map
Control Point: (x, y): Coordination of Center MB location of Water Ring
Start Point: (Sx, Sy): Coordination of Center MB location of Water Ring $$Sx = \left(x - \left(\frac{|Width - Height|}{2}\right)\right)$$
$$Sy = (y)$$

W: Core number of MBs of Water Ring $$W = |Width - Height|$$

CodeMB (x, y): A coding function for designated macro block. According to Water Ring scan order, VLC or VLD for each bit-plane are performed in the FGS encoder and decoder, respectively. x and y are coordinate of macro block in the image frame.

flag CheckBound ( ): A checking function for out of bound Map. If the CheckBound ( ) set (return TRUE), bellow iteration aborted. This mean is coded All block already. If the CheckBound ( ) function return FALSE, Next step is executed.

Coordinate is a unit of macro block.

```
□ Algorithm
Step 1. code the start point of Water Ring and core part (include control point).
The Water Ring origin is located at (x, y)
for (i=0;i<W;i++)
    CodeMB(Sx+i, Sy)
j=1;
Step 2. Check Stopping condition of the Algorithm.
If(CheckBound ( )==NULL) go to step 6.
Step 3. Code the top line and right line of the Water Ring
for (i=−j;i<W+3*j−1;i++)
    if(i<W+j)
        CodeMB(Sx+i,Sy−j);
    Else
        CodeMB(Sx+W+j−1,Sy+i−(W+2*j−1));
Step 4. Check stopping condition of the Algorithm.
If(CheckBound( )==NULL) go to step 6.
Step 5. Code the Bottom line and left line of the Water Ring.
for(i=−j;i<W+3*j−1;i++)
    if(i<j)
        CodeMB(Sx−j,Sy+i+1);
    else
        CodeMB(Sx+i−2*j+1,Sy+j);
Step 6. Check stopping condiction of the Algorithm.
If(j≦Width)
    j++;
    go to Step 2.
else
    Stop.
```

The water ring scan order method described in the first embodiment is for the explanation of the basic principle in which the embodiment of the hardware is not considered. In coding 1-1 and 1-2 encoding in zigzag becomes the main reason for dropping the hit-rate of the Cache. Accordingly, after encoding 2-1, not encoding 1-1 and 1-2 in zigzag order but encoding 1-2 downward, 1-1 downward, too, and then 2-2, the hit-rate of the cache can be heightened through this predictable and successive method.

Figure 15:
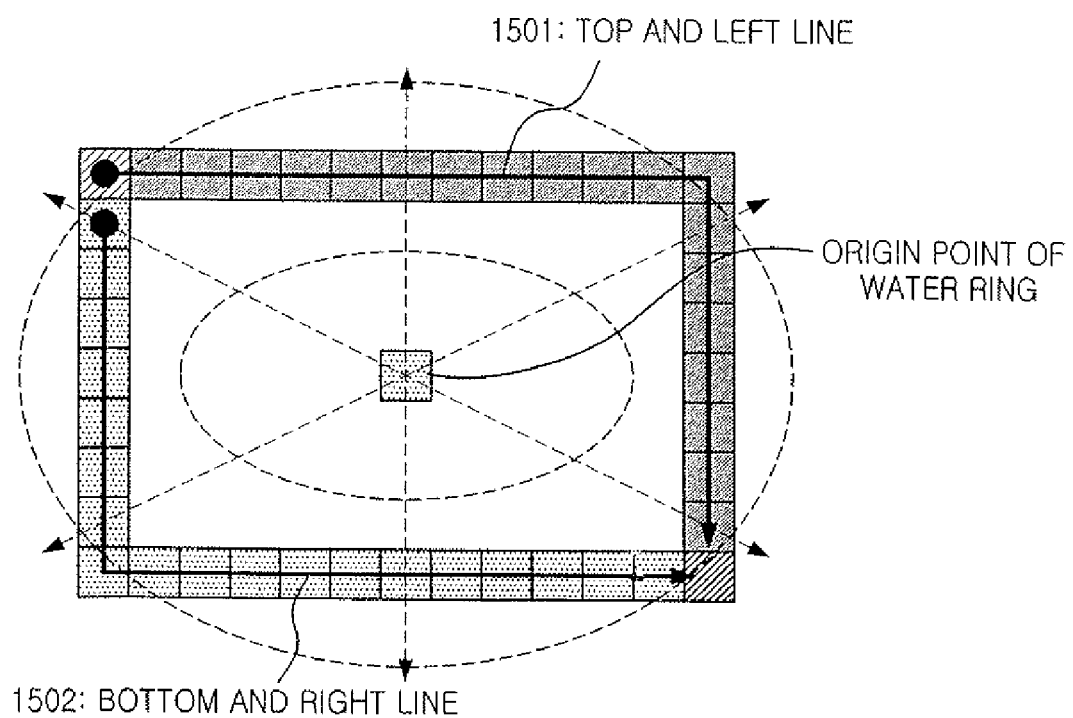
FIG. 15 is a diagram describing the order for scanning the $i^{th}$ water ring effectively in water ring scan order of 16:9 display ratio in accordance with another embodiment of the present invention.

FIG. 15 is a diagram describing the order for scanning the $i^{th}$ water ring effectively in water ring scan order of 16:9 display ratio in accordance with another embodiment of the present invention.

In the i-th water ring, first, the 2-1 is coded and its right part is coded (1501). After the line on the right finishes being coded, the one on the left is coded, then followed by the coding of the line below (1502). That is, in the conventional method, in case of coding a third water ring, the coding is performed in a total of 11 unpredictable locations. However, in this newly suggested method, the hit-rate can be heightened up considerably by diverging coding lines only twice: one at the starting point of an $i^{th}$ water ring and the other at the divergence point of the water ring, i.e., a location where coding for macro blocks below and left starts after the coding of the upper right macro blocks. The conventional method gets divergences more and more as a water ring becomes bigger, but in the method of the present invention, the divergence is fixed in twice only This way, water rings are repeated until the entire frame is coded.

The present invention described above encodes and transmits information of a certain part of an image that has visual significance on a top priority so as to be suitable to a human visual system and at the receiving part, the image information is decoded with priority so that even when all the bitstreams transmitted from the encoder are not received at the decoder due to the limitation of the delivery layer bandwidth, the quality of the image in the certain part can be secured.

While the present invention has been described with respect to certain preferred embodiments, it will be apparent to those skilled in the art that various changes and modifications may be made without departing from the scope of the invention as defined in the following claims.

What is claimed is:

1. A water ring encoding method of processing an initial data set, the method comprising:
   writing a portion of data from the initial data set into a scanned data string, wherein
      the initial data set is organized into RC (Row Column) positions,
      a grouping of RC positions (RC grouping) of the initial data set being designated to correspond to an initial origin,
      the initial origin is enveloped by a plurality of nested initial environs that successively surround each other,
      each nested initial environ corresponds to a family of RC groupings of the initial data set, such that the family of RC groupings of the initial data set that correspond to an $i^{th}$ nested initial environ (i),
   wherein writing of the portion of the data from the initial data set into a scanned data string starts by writing the RC grouping that corresponds to the initial origin (initial water ring (0)) and by sequentially progressing outwardly away from the initial water ring (0) the family of RC groupings that correspond to a nearest nested initial environ (initial water ring (1)) and towards the family of RC groupings that correspond to a furthest nested initial environ (initial water ring (n)); and
   encoding the scanned data string into an encoded data string.

2. The method of claim 1, further comprising transmitting the encoded data string.

3. The method of claim 1, further comprising stopping the writing of the initial data set into the scanned data string such that not all of the data from the initial data set is written into the scanned data string prior to encoding the scanned data string into an encoded data string.

4. The method of claim 1, further comprising: stopping the writing of the initial data set into the scanned data string; and using a clock set point to terminate the writing.

5. The method of claim 1, further comprising stopping the encoding of the scanned data string into the encoded data string.

6. The method of claim 1, further comprising: stopping the encoding of the scanned data string into the encoded data string; and using a clock set point to terminate the encoding.

7. The method of claim 1, wherein each data of the initial data set comprises a plurality of hierarchical significant data sub-components, wherein said writing step comprises writing a most hierarchical significant data sub-component plane of the initial data set into the scanned data string before writing progressively towards lesser hierarchical significant data sub-component planes of the initial data set by sequentially progressing the writing towards a least hierarchical significant data sub-component plane of the initial data set.

8. The method of claim 7, wherein the most hierarchical significant data sub-component plane comprises a most significant byte plane of the initial data set, and the least hierarchical significant data sub-component plane comprises a least significant byte plane of the initial data set.

9. The method of claim 7, wherein the most hierarchical significant data sub-component plane comprises a most significant bit (MSB) plane of the initial data set, and the least hierarchical significant data sub-component plane comprises a least significant bit (LSB) plane of the initial data set.

10. The method of claim 7, wherein the hierarchical significant data components of the initial data set comprises a MSB-0 (First Most Significant Bit) data sub-component, a MSB-1 (Second Most Significant Bit) data sub-component, a MSB-2 (Third Most Significant Bit) data sub-component, and a LSB (Least Significant Bit) data sub-component.

11. The method of claim 10, wherein the writing step comprising writing a MSB (Most Significant Bit) plane of the initial data set into the scanned data string before writing progressively towards lesser significant bit planes of the initial data set by sequentially progressing the writing towards a LSB (Least Significant Bit) plane of the initial data set into the scanned data string.

12. The method of claim 1, wherein each RC grouping of the initial data set corresponding to an individual pixel of the initial data set.

13. The method of claim 1, wherein each RC grouping of the initial data set corresponding to an individual data block wherein each data block composed of one Row and Column position (1×1) of the initial data set.

14. The method of claim 1, wherein each RC grouping of the initial data set corresponding to an individual data block wherein each data block composed of eight contiguous Row and Column positions (8×8) of the initial data set.

15. The method of claim 1, wherein each RC grouping of the initial data set corresponding to an individual macro block wherein each macro data block composed of sixteen contiguous Row and Column positions (16×16) of the initial data set.

16. The method of claim 1, wherein the encoding step comprises compressing the scanned data string into the encoded data string.

17. The method of claim 16, wherein the encoding step comprises compressing the scanned data string into the encoded data string with source coding compression.

18. The method of claim 16, wherein the encoding step comprises compressing the scanned data string into the encoded data string with using channel coding compression.

19. The method of claim 1, wherein each nested initial environ having a rectangular shape.

20. The method of claim 1, wherein each nested initial environ having a square shape.

21. The method of claim 1, wherein the family of the RC groupings of the initial data set corresponding to an $i^{th}$ nested initial environ (i) comprises: all the RC groupings corresponding to −i distance away from the initial origin along an x-axis and simultaneously corresponding to ±i distances away from the initial origin along a y-axis; all the RC groupings corresponding to +i distance away from initial origin along the x-axis and simultaneously corresponding to ±i distances away from the initial origin along the y-axis; all the RC groupings corresponding to −i distance away from the initial origin along the y-axis and simultaneously corresponding to ±i distances away from the initial origin along the x-axis; all the RC groupings corresponding to +i distance away from the initial origin along the y-axis and simultaneously corresponding to ±i distances away from the initial origin along the x-axis; and all the RC groupings corresponding to ±i distances away from the initial origin along the x-axis and the y-axis.

22. The method of claim 1, wherein the initial data set corresponds to an initial image frame.

23. The method of claim 1, wherein a plurality of RC groupings of the initial data set being designated to correspond to a plurality of initial origins.

24. The method of claim 1, encoding uses discrete cosine transformation.

25. The method of claim 1, encoding uses wavelet conversion.

26. A water ring encoding method of processing an initial data set, the method comprising:
    writing a portion of data from the initial data set into a scanned data string,
    wherein the initial data set is organized into RC (Row Column) positions,
    a grouping of RC positions (RC grouping) of the initial data set being designated to correspond to an initial origin,
    the initial origin is enveloped by a plurality of nested initial environs that successively surround each other,
    each nested initial environ corresponds to a family of RC groupings of the initial data set,
    wherein writing of the portion of the data from the initial data set into the scanned data string starts by writing the RC grouping that corresponds to the initial origin (initial water ring (0)) and by sequentially progressing outwardly away from the initial water ring (0) the family of RC groupings that correspond to a nearest nested initial environ (initial water ring (1)) towards the family of RC groupings that correspond to a furthest nested initial environ (initial water ring (n));
    encoding the scanned data string into an encoded data string; and
    transmitting the encoded data string.

27. The method of claim 26, further comprising stopping the writing of the initial data set into the scanned data string such that not all of the data from the initial data set is written into the scanned data string prior to encoding the scanned data string into an encoded data string.

28. The method of claim 26, further comprising: stopping the writing of the initial data set into the scanned data string; and using a clock set point to enable the stopping writing of the initial data set into the scanned data string.

29. The method of claim 26, further comprising stopping the encoding of the scanned data string into the encoded data string.

30. The method of claim 26, further comprising: stopping the encoding of the scanned data string into the encoded data string; and using a clock set point to enable stopping encoding of the scanned data string into the encoded data string.

\* \* \* \* \*